(12) United States Patent
Chandler

(10) Patent No.: US 8,437,941 B2
(45) Date of Patent: May 7, 2013

(54) AUTOMATED TUNING OF GAS TURBINE COMBUSTION SYSTEMS

(75) Inventor: Christopher Chandler, Austin, TX (US)

(73) Assignee: Gas Turbine Efficiency Sweden AB, Jarfalla (SE)

( * ) Notice: Subject to any disclaimer, the term of this patent is extended or adjusted under 35 U.S.C. 154(b) by 1034 days.

(21) Appl. No.: 12/463,060

(22) Filed: May 8, 2009

(65) Prior Publication Data

US 2010/0286890 A1 Nov. 11, 2010

(51) Int. Cl.
| F02C 9/48 | (2006.01) |
| F02C 9/28 | (2006.01) |
| F02C 9/20 | (2006.01) |
| F02C 9/16 | (2006.01) |
| F02C 9/56 | (2006.01) |
| F02C 9/40 | (2006.01) |

(52) U.S. Cl.
USPC ........... 701/100; 700/286; 700/287; 700/290; 290/52

(58) Field of Classification Search ............ 701/99–100, 701/287–290; 290/52
See application file for complete search history.

(56) References Cited

U.S. PATENT DOCUMENTS

| 3,842,597 A | 10/1974 | Ehrich | 60/226 |
| 3,866,109 A | 2/1975 | Reed et al. | 322/15 |
| 3,875,380 A | 4/1975 | Rankin | 235/151.1 |
| 3,898,439 A | 8/1975 | Reed et al. | 235/151.21 |
| 3,919,623 A | 11/1975 | Reuther | 322/15 |
| 3,924,140 A | 12/1975 | Yannone | 290/40 |
| 4,010,605 A | 3/1977 | Uram | 60/39.14 |
| 4,027,145 A | 5/1977 | McDonald et al. | 235/151.21 |
| 4,028,884 A | 6/1977 | Martz et al. | 60/39.18 |
| 4,031,404 A | 6/1977 | Martz et al. | 290/40 |
| 4,039,804 A | 8/1977 | Reed et al. | 235/151.21 |
| 4,039,846 A | 8/1977 | Vance | 290/4 |
| 4,051,669 A | 10/1977 | Yannone et al. | 60/39.03 |
| 4,115,998 A | 9/1978 | Gilbert et al. | 60/39.09 |

(Continued)

FOREIGN PATENT DOCUMENTS

| EP | 0 306 064 | 3/1989 |
| EP | 2 014 898 | 1/2009 |

(Continued)

OTHER PUBLICATIONS

Jesse Sewell, Pete Sobieski, and Craig Beers, "Application of Continuous Combustion Dynamics Monitoring on Large Industrial Gas Turbines," ASME Conf. Proc. 2004, 807 (2004).

(Continued)

Primary Examiner — Khoi Tran
Assistant Examiner — Dale Moyer
(74) Attorney, Agent, or Firm — DLA Piper LLP (US)

(57) ABSTRACT

A system for tuning the operation of a gas turbine is provided based on measuring operational parameters of the turbine and directing adjustment of operational controls for various operational elements of the turbine. A controller is provided for communicating with sensors and controls within the system. The controller receiving operational data from the sensors and comparing the data to stored operational standards to determining if turbine operation conforms to the standards. The controller then communicates selected adjustment in an operational parameter of the turbine. The controller then receives additional operational data from the sensors to determine if an additional adjustment is desired or is adjustment is desired of a further selected operational parameter.

6 Claims, 10 Drawing Sheets

U.S. PATENT DOCUMENTS

| | | | | |
|---|---|---|---|---|
| 4,195,231 | A | 3/1980 | Reed et al. | 290/40 |
| 4,201,923 | A | 5/1980 | Reed et al. | 290/40 |
| 4,208,591 | A | 6/1980 | Yannone et al. | 290/50 |
| 4,278,064 | A | 7/1981 | Regueiro | 123/577 |
| 4,280,060 | A | 7/1981 | Kure-Jensen et al. | |
| 4,283,634 | A | 8/1981 | Yannone et al. | 290/40 |
| 4,305,129 | A | 12/1981 | Yannone et al. | 364/492 |
| 4,308,463 | A | 12/1981 | Giras et al. | 290/1 |
| 4,314,441 | A | 2/1982 | Yannone et al. | 60/39.28 |
| 4,319,320 | A | 3/1982 | Sato et al. | |
| 4,414,540 | A | 11/1983 | Dickenson | |
| 4,445,180 | A | 4/1984 | Davis et al. | 364/494 |
| 4,455,614 | A | 6/1984 | Martz et al. | 364/494 |
| 4,716,858 | A | 1/1988 | Bartels | |
| 4,735,052 | A | 4/1988 | Maeda et al. | |
| 4,811,555 | A | 3/1989 | Bell | 60/39.06 |
| 4,845,940 | A | 7/1989 | Beer | 60/732 |
| 4,893,467 | A | 1/1990 | Woodson | 60/39.3 |
| 4,930,305 | A | 6/1990 | Bell | 60/39.06 |
| 4,936,088 | A | 6/1990 | Bell | 60/39.06 |
| 5,022,849 | A | 6/1991 | Yoshii et al. | |
| 5,024,055 | A | 6/1991 | Kirikami et al. | 60/39.27 |
| 5,237,939 | A | 8/1993 | Spokoyny et al. | 110/345 |
| 5,307,619 | A | 5/1994 | McCarty et al. | |
| 5,319,931 | A | 6/1994 | Beebe et al. | |
| 5,339,635 | A | 8/1994 | Iwai et al. | |
| 5,349,812 | A | 9/1994 | Taniguchi et al. | |
| 5,365,732 | A | 11/1994 | Correa | |
| 5,367,470 | A | 11/1994 | Lang | 364/498 |
| 5,423,175 | A | 6/1995 | Beebe et al. | |
| 5,450,724 | A | 9/1995 | Kesseli et al. | 60/737 |
| 5,480,298 | A | 1/1996 | Brown | 431/79 |
| 5,487,265 | A | 1/1996 | Rajamani et al. | 60/39.03 |
| 5,490,377 | A | 2/1996 | Janes | 60/39.12 |
| 5,491,970 | A | 2/1996 | Davis, Jr. et al. | |
| 5,517,424 | A | 5/1996 | Marcelle et al. | 364/494 |
| 5,533,329 | A | 7/1996 | Ohyama et al. | |
| 5,551,228 | A | 9/1996 | Mick et al. | |
| 5,564,270 | A | 10/1996 | Kesseli et al. | 60/39.06 |
| 5,609,655 | A | 3/1997 | Kesseli et al. | 48/180.1 |
| 5,636,507 | A | 6/1997 | Rajamani et al. | |
| 5,661,969 | A | 9/1997 | Beebe et al. | |
| 5,706,643 | A | 1/1998 | Snyder et al. | |
| 5,719,791 | A | 2/1998 | Neumeier et al. | 364/574 |
| 5,722,230 | A | 3/1998 | Cohen et al. | |
| 5,729,968 | A | 3/1998 | Cohen et al. | |
| 5,784,300 | A | 7/1998 | Neumeier et al. | 364/574 |
| 5,790,420 | A | 8/1998 | Lang | 364/494 |
| 5,791,889 | A | 8/1998 | Gemmen et al. | 431/1 |
| 5,794,446 | A | 8/1998 | Earley et al. | |
| 5,826,429 | A | 10/1998 | Beebe et al. | |
| 5,845,230 | A | 12/1998 | Lamberson | |
| 5,847,353 | A | 12/1998 | Titus et al. | |
| 5,878,566 | A | 3/1999 | Endo et al. | 60/39.03 |
| 5,896,736 | A | 4/1999 | Rajamani | |
| 5,924,275 | A | 7/1999 | Cohen et al. | |
| 5,943,866 | A | 8/1999 | Lovett et al. | |
| 6,055,808 | A | 5/2000 | Poola et al. | 60/274 |
| 6,066,825 | A | 5/2000 | Titus et al. | |
| 6,082,092 | A | 7/2000 | Vandervort | |
| 6,092,362 | A | 7/2000 | Nagafuchi et al. | 60/39.281 |
| 6,125,625 | A | 10/2000 | Lipinski et al. | 60/39.141 |
| 6,138,081 | A | 10/2000 | Olejack et al. | |
| 6,145,297 | A | 11/2000 | Nagafuchi et al. | 60/39.281 |
| 6,164,055 | A | 12/2000 | Lovett et al. | |
| 6,195,607 | B1 | 2/2001 | Rajamani et al. | |
| 6,196,000 | B1 | 3/2001 | Fassbender | 60/649 |
| 6,202,401 | B1 | 3/2001 | Seume et al. | |
| 6,205,765 | B1 | 3/2001 | Iasillo et al. | 60/39.06 |
| 6,250,063 | B1 | 6/2001 | Davis, Jr. et al. | |
| 6,269,299 | B1 | 7/2001 | Blotenberg | 701/100 |
| 6,287,111 | B1 | 9/2001 | Gensler | |
| 6,293,105 | B1 | 9/2001 | Claesson et al. | |
| 6,298,718 | B1 | 10/2001 | Wang | |
| 6,324,827 | B1 | 12/2001 | Basu et al. | |
| 6,338,240 | B1 | 1/2002 | Endo et al. | |
| 6,341,519 | B1 | 1/2002 | Khesin et al. | 73/23.32 |
| 6,343,251 | B1 | 1/2002 | Herron et al. | |
| 6,354,071 | B2 | 3/2002 | Tegel et al. | |
| 6,363,330 | B1 | 3/2002 | Alag et al. | 702/132 |
| 6,389,330 | B1 | 5/2002 | Khesin | 700/274 |
| 6,397,602 | B2 | 6/2002 | Vandervort et al. | |
| 6,405,523 | B1 | 6/2002 | Foust et al. | |
| 6,408,611 | B1 | 6/2002 | Keller et al. | |
| 6,412,271 | B1 | 7/2002 | Maker et al. | |
| 6,418,726 | B1 | 7/2002 | Foust et al. | |
| 6,460,339 | B2 | 10/2002 | Nishida et al. | |
| 6,460,341 | B1 | 10/2002 | Gutmark et al. | |
| 6,461,144 | B1 | 10/2002 | Gutmark et al. | |
| 6,464,489 | B1 | 10/2002 | Gutmark et al. | |
| 6,466,859 | B1 | 10/2002 | Fujime | 701/106 |
| 6,480,810 | B1 | 11/2002 | Cardella et al. | 702/188 |
| 6,484,489 | B1 | 11/2002 | Foust et al. | |
| 6,522,991 | B2 | 2/2003 | Banaszuk et al. | 702/138 |
| 6,522,994 | B1 | 2/2003 | Lang | 702/183 |
| 6,529,849 | B2 | 3/2003 | Umezawa et al. | 702/136 |
| 6,556,956 | B1 | 4/2003 | Hunt | 702/188 |
| 6,560,563 | B1 | 5/2003 | Lang | 702/182 |
| 6,568,166 | B2 | 5/2003 | Jay et al. | |
| 6,584,429 | B1 | 6/2003 | Lang | 702/182 |
| 6,598,383 | B1 | 7/2003 | Vandervort et al. | |
| 6,612,112 | B2 | 9/2003 | Gilbreth et al. | |
| 6,616,901 | B1 | 9/2003 | Lagana et al. | |
| 6,640,544 | B2 | 11/2003 | Suenaga et al. | 60/725 |
| 6,651,035 | B1 | 11/2003 | Lang | 702/183 |
| 6,657,332 | B2 | 12/2003 | Balas | 310/58 |
| 6,672,071 | B2 | 1/2004 | Woltmann | |
| 6,691,054 | B1 | 2/2004 | Lang | 702/100 |
| 6,694,900 | B2 | 2/2004 | Lissianski et al. | 110/345 |
| 6,704,620 | B1 | 3/2004 | Kutzner et al. | 700/287 |
| 6,714,877 | B1 | 3/2004 | Lang | 702/32 |
| 6,721,631 | B2 | 4/2004 | Shimizu et al. | 700/287 |
| 6,721,649 | B2 | 4/2004 | Knott et al. | 701/114 |
| 6,722,135 | B2 | 4/2004 | Davis, Jr. et al. | |
| 6,725,665 | B2 | 4/2004 | Tuschy et al. | |
| 6,742,341 | B2 | 6/2004 | Ryan et al. | 60/773 |
| 6,745,152 | B1 | 6/2004 | Lang | 702/183 |
| 6,757,619 | B2 | 6/2004 | Zison et al. | 702/31 |
| 6,760,659 | B1 | 7/2004 | Cowen | 701/113 |
| 6,760,689 | B2 | 7/2004 | Follin et al. | 702/188 |
| 6,766,224 | B2 | 7/2004 | Tanaka | 700/287 |
| 6,772,583 | B2 | 8/2004 | Bland | |
| 6,789,000 | B1 | 9/2004 | Munson, Jr. | 700/287 |
| 6,799,146 | B1 | 9/2004 | Lang | 702/183 |
| 6,810,358 | B1 | 10/2004 | Lang et al. | 702/182 |
| 6,810,655 | B2 | 11/2004 | Davis, Jr. et al. | |
| 6,834,226 | B2 | 12/2004 | Hartzheim | 701/100 |
| 6,839,613 | B2 | 1/2005 | McCarthy et al. | 700/287 |
| 6,840,046 | B2 | 1/2005 | Paschereit et al. | |
| 6,845,300 | B2 | 1/2005 | Haghgooie et al. | 700/289 |
| 6,862,889 | B2 | 3/2005 | Held et al. | |
| 6,865,889 | B2 | 3/2005 | Mancini et al. | |
| 6,868,368 | B1 | 3/2005 | Lang | 702/188 |
| 6,871,501 | B2 | 3/2005 | Bibler et al. | |
| 6,873,933 | B1 | 3/2005 | Lang | 702/183 |
| 6,877,307 | B2 | 4/2005 | Ryan et al. | 600/39.281 |
| 6,880,325 | B2 | 4/2005 | Aoyama | |
| 6,883,301 | B2 | 4/2005 | Woltmann | |
| 6,898,488 | B2 | 5/2005 | Kusaka et al. | 700/286 |
| 6,910,335 | B2 | 6/2005 | Viteri et al. | 60/786 |
| 6,912,855 | B2 | 7/2005 | Bescherer et al. | |
| 6,912,856 | B2 | 7/2005 | Morgan et al. | 60/773 |
| 6,912,889 | B2 | 7/2005 | Staphanos et al. | 73/23.31 |
| 6,918,253 | B2 | 7/2005 | Fassbender | 60/649 |
| 6,920,761 | B2 | 7/2005 | Laper | 60/772 |
| 6,931,853 | B2 | 8/2005 | Dawson | |
| 6,941,217 | B1 | 9/2005 | Munson, Jr. | 701/100 |
| 6,952,639 | B2 | 10/2005 | Kumar et al. | |
| 6,952,642 | B1 | 10/2005 | Cowen | 701/113 |
| 6,955,039 | B2 | 10/2005 | Nomura et al. | |
| 6,968,693 | B2 | 11/2005 | Colibaba-Evulet et al. | 60/748 |
| 6,973,376 | B2 | 12/2005 | Kusaka et al. | 700/286 |
| 6,973,790 | B2 | 12/2005 | Suenaga et al. | 60/725 |
| 6,973,791 | B2 | 12/2005 | Handelsman et al. | 60/773 |
| 6,976,351 | B2 | 12/2005 | Catharine et al. | |
| 6,986,254 | B2 | 1/2006 | Stuttaford et al. | |
| 6,989,693 | B2 | 1/2006 | Kuo et al. | 327/102 |

| | | | | | | | |
|---|---|---|---|---|---|---|---|
| 6,990,432 | B1 | 1/2006 | McCarthy et al. ............ 702/184 | 7,489,835 | B1 | 2/2009 | Xia et al. ................. 385/12 |
| 6,996,991 | B2 | 2/2006 | Gadde et al. | 7,490,596 | B2 | 2/2009 | Yasui et al. ................. 123/697 |
| 7,006,898 | B2 | 2/2006 | Barbir et al. ................. 700/286 | 7,493,207 | B2 | 2/2009 | Yasui et al. ................. 701/103 |
| 7,007,487 | B2 | 3/2006 | Belokon et al. ................. 60/777 | 7,493,752 | B2 | 2/2009 | Horswill et al. ............... 60/243 |
| 7,039,555 | B2 | 5/2006 | Lang ............................ 702/183 | 7,503,177 | B2 | 3/2009 | Bland et al. ................... 60/772 |
| 7,047,747 | B2 | 5/2006 | Tanaka ............................ 60/773 | 7,509,810 | B2 | 3/2009 | Smith et al. ................... 60/772 |
| 7,050,943 | B2 | 5/2006 | Kauffman et al. | 7,512,476 | B2 | 3/2009 | Rosi et al. |
| 7,059,135 | B2 | 6/2006 | Held et al. | 7,513,099 | B2 | 4/2009 | Nuding et al. ............ 60/39.281 |
| 7,062,389 | B2 | 6/2006 | Johnson et al. ................. 702/61 | 7,530,216 | B2 | 5/2009 | Tsuzuki et al. ............ 60/39.281 |
| 7,065,471 | B2 | 6/2006 | Gotoh et al. | 7,530,260 | B2 | 5/2009 | Dooley ....................... 73/112.06 |
| 7,065,472 | B2 | 6/2006 | Hayashi et al. | 7,534,033 | B2 | 5/2009 | Prinz et al. ................. 374/144 |
| 7,089,746 | B2 | 8/2006 | Lieuwen et al. | 7,536,992 | B1 | 5/2009 | Wieshuber et al. ........... 123/352 |
| 7,100,357 | B2 | 9/2006 | Morgan et al. ............ 60/39.281 | 7,546,741 | B2 | 6/2009 | Sasao et al. ................... 60/778 |
| 7,107,773 | B2 | 9/2006 | Little | 7,562,532 | B2 | 7/2009 | Diaz et al. .................... 60/775 |
| 7,111,463 | B2 | 9/2006 | Sprouse et al. ................. 60/776 | 7,565,238 | B2 | 7/2009 | Nakagawa et al. ........... 701/113 |
| 7,127,329 | B2 | 10/2006 | Kusaka et al. ................. 700/286 | 7,565,792 | B2 | 7/2009 | Tanaka et al. |
| 7,127,898 | B2 | 10/2006 | Healy ............................ 60/773 | 7,565,805 | B2 | 7/2009 | Steber et al. |
| 7,143,572 | B2 | 12/2006 | Ooka et al. ................. 60/39.182 | 7,568,349 | B2 | 8/2009 | Hadley |
| 7,161,678 | B2 | 1/2007 | Schultz ........................ 356/438 | 7,571,045 | B2 | 8/2009 | Muramatsu et al. |
| 7,162,875 | B2 | 1/2007 | Fletcher et al. | 7,577,549 | B2 | 8/2009 | Osborn et al. |
| 7,177,728 | B2 | 2/2007 | Gardner ........................ 700/295 | 7,582,359 | B2 | 9/2009 | Sabol et al. |
| 7,181,320 | B2 | 2/2007 | Whiffen et al. ............... 700/286 | 7,584,617 | B2 | 9/2009 | Bland et al. |
| 7,181,321 | B2 | 2/2007 | Schlicker et al. ............. 700/297 | 7,591,135 | B2 | 9/2009 | Stewart |
| 7,181,916 | B2 | 2/2007 | Ziminsky et al. | 7,600,369 | B2 | 10/2009 | Tanaka et al. |
| 7,185,494 | B2 | 3/2007 | Ziminsky et al. | 7,610,745 | B2 | 11/2009 | Fujii et al. |
| 7,188,019 | B2 | 3/2007 | Nomura et al. | 7,610,746 | B2 | 11/2009 | Fujii et al. |
| 7,188,465 | B2 | 3/2007 | Kothnur et al. | 7,617,686 | B2 | 11/2009 | Lilley et al. |
| 7,190,149 | B2 | 3/2007 | Huff et al. ........................ 322/20 | 7,617,687 | B2 | 11/2009 | West et al. |
| 7,204,133 | B2 | 4/2007 | Benson et al. | 7,620,461 | B2 | 11/2009 | Frederick et al. |
| 7,210,297 | B2 | 5/2007 | Shah et al | 7,623,999 | B2 | 11/2009 | Clayton |
| 7,216,486 | B2 | 5/2007 | Doebbeling et al. | 7,628,062 | B2 | 12/2009 | Healy et al. |
| 7,219,040 | B2 | 5/2007 | Renou et al. ...................... 703/6 | 7,628,078 | B2 | 12/2009 | Matsui et al. |
| 7,234,305 | B2 | 6/2007 | Nomura et al. | 7,630,820 | B2 | 12/2009 | Sims et al. |
| 7,237,385 | B2 | 7/2007 | Carrea | 7,632,059 | B2 | 12/2009 | Tisenchek et al. |
| 7,246,002 | B2 | 7/2007 | Healy et al. ................... 701/100 | 7,640,725 | B2 | 1/2010 | Bland et al. |
| 7,246,024 | B2 | 7/2007 | Muramatsu et al. | 7,640,793 | B2 | 1/2010 | McCall et al. |
| 7,249,462 | B2 | 7/2007 | Aumont et al. | 7,644,574 | B2 | 1/2010 | Feiz |
| 7,260,466 | B2 | 8/2007 | Fujii | 7,644,577 | B2 | 1/2010 | Linna et al. |
| 7,260,935 | B2 | 8/2007 | Colibaba-Evulet et al. .... 60/748 | 7,647,778 | B2 | 1/2010 | Zewde et al. |
| 7,260,937 | B2 | 8/2007 | Kothnur et al. | 7,650,050 | B2 | 1/2010 | Haffner et al. |
| 7,269,939 | B2 | 9/2007 | Kothnur et al. | 7,665,670 | B2 | 2/2010 | Ahmed |
| 7,269,952 | B2 | 9/2007 | Arar et al. | 7,677,075 | B2 | 3/2010 | Nies |
| 7,269,953 | B2 | 9/2007 | Gadde et al. | 7,681,440 | B2 | 3/2010 | Thomassin et al. |
| 7,275,025 | B2 | 9/2007 | Chan et al. | 7,684,880 | B2 | 3/2010 | Bach |
| 7,278,266 | B2 | 10/2007 | Taware et al. | 7,690,204 | B2 | 4/2010 | Drnevich et al. |
| 7,284,378 | B2 | 10/2007 | Amond, III et al. | 7,692,324 | B2 | 4/2010 | Malakhova et al. |
| 7,288,921 | B2 | 10/2007 | Huff et al. ........................ 322/20 | 7,693,147 | B2 | 4/2010 | Williams et al. |
| 7,299,279 | B2 | 11/2007 | Sadaghiany | 7,693,643 | B2 | 4/2010 | Kim et al. |
| 7,302,334 | B2 | 11/2007 | Hook et al. | 7,698,030 | B2 | 4/2010 | Martin |
| 7,320,213 | B2 | 1/2008 | Shah et al. | 7,698,897 | B2 | 4/2010 | Rowe et al. |
| 7,334,413 | B2 | 2/2008 | Myhre ............................ 60/803 | 7,702,447 | B2 | 4/2010 | Volponi |
| 7,349,765 | B2 | 3/2008 | Reaume et al. ............... 700/295 | 7,703,288 | B2 | 4/2010 | Rogers |
| 7,353,084 | B2 | 4/2008 | Schaper et al. ............... 700/287 | 7,707,833 | B1 | 5/2010 | Bland et al. |
| 7,356,383 | B2 | 4/2008 | Pechtl et al. ................... 700/288 | 7,712,313 | B2 | 5/2010 | Kojovic et al. |
| 7,368,827 | B2 | 5/2008 | Kulkarni et al. | 7,730,726 | B2 | 6/2010 | Asti et al. |
| 7,369,932 | B2 | 5/2008 | Kim et al. | 7,751,943 | B2 | 7/2010 | Bollhalder et al. |
| 7,377,036 | B2 | 5/2008 | Johnson et al. | 7,756,626 | B2 | 7/2010 | Fujii et al. |
| 7,385,300 | B2 | 6/2008 | Huff et al. ........................ 290/40 | 7,757,491 | B2 | 7/2010 | Hessler |
| 7,389,151 | B2 | 6/2008 | Badami et al. ................. 700/28 | 7,765,856 | B2 | 8/2010 | Wilbraham |
| 7,389,643 | B2 | 6/2008 | Simons et al. | 7,769,507 | B2 | 8/2010 | Volponi et al. |
| 7,406,820 | B2 | 8/2008 | Critchley et al. .......... 60/39.281 | 7,775,052 | B2 | 8/2010 | Cornwell et al. |
| 7,409,855 | B2 | 8/2008 | Flint ............................ 73/118.1 | 7,788,014 | B2 | 8/2010 | Volponi |
| 7,415,779 | B2 | 8/2008 | St. Louis et al. | 7,797,113 | B2 | 9/2010 | Yoshida et al. |
| 7,435,080 | B2 | 10/2008 | Joklik et al. ...................... 431/4 | 7,805,922 | B2 | 10/2010 | Bland |
| 7,437,871 | B2 | 10/2008 | Cook | 7,818,970 | B2 | 10/2010 | Price et al. |
| 7,441,398 | B2 | 10/2008 | Ziminsky et al. .......... 60/39.281 | 7,822,512 | B2 | 10/2010 | Thatcher et al. |
| 7,441,448 | B2 | 10/2008 | Volponi .................... 73/112.03 | 7,822,576 | B2 | 10/2010 | Flint et al. |
| 7,451,601 | B2 | 11/2008 | Taware et al. ................. 60/773 | 7,823,388 | B2 | 11/2010 | Murakami |
| 7,456,517 | B2 | 11/2008 | Campbell et al. ............... 307/53 | 7,826,954 | B2 | 11/2010 | Muramatsu et al. |
| 7,457,688 | B2 | 11/2008 | Szepek et al. ................. 700/287 | 7,832,210 | B2 | 11/2010 | Fecamp et al. |
| 7,457,710 | B2 | 11/2008 | Schuermans et al. ........... 702/30 | 7,836,676 | B2 | 11/2010 | Futa, Jr. et al. |
| 7,461,509 | B2 | 12/2008 | Mick et al. ...................... 60/779 | 7,837,429 | B2 | 11/2010 | Zhang et al. |
| 7,471,996 | B2 | 12/2008 | Bartel ................................ 701/4 | 7,840,336 | B2 | 11/2010 | Muramatsu et al. |
| 7,474,080 | B2 | 1/2009 | Huff et al. ........................ 322/24 | 7,841,180 | B2 | 11/2010 | Kraemer et al. |
| 7,478,525 | B2 | 1/2009 | Iya et al. .......................... 60/204 | 7,841,317 | B2 | 11/2010 | Williams et al. |
| 7,481,100 | B2 | 1/2009 | Ponziani et al. ........... 73/112.01 | 7,853,433 | B2 | 12/2010 | He et al. |
| 7,484,369 | B2 | 2/2009 | Myhre ............................ 60/803 | 7,853,441 | B2 | 12/2010 | Volponi et al. |
| 7,486,864 | B2 | 2/2009 | Diatzikis .................... 385/123 | 7,861,578 | B2 | 1/2011 | Adibhatla et al. |
| 7,487,642 | B2 | 2/2009 | Joshi et al. ...................... 60/775 | 7,871,237 | B2 | 1/2011 | Bunce et al. |

| Patent/Publication | Date | Inventor(s) | Class |
|---|---|---|---|
| 7,878,004 B2 | 2/2011 | Davies et al. | |
| 7,886,875 B2 | 2/2011 | Shevchencko et al. | |
| 7,895,821 B2 | 3/2011 | Annigeri et al. | |
| 7,908,072 B2 | 3/2011 | Tonno et al. | |
| 7,927,095 B1 | 4/2011 | Chorpening et al. | |
| 7,942,038 B2 | 5/2011 | Ziminsky et al. | |
| 7,945,523 B2 | 5/2011 | Hofmann et al. | |
| 7,950,216 B2 | 5/2011 | Dooley et al. | |
| 7,966,100 B2 | 6/2011 | Beekhuis | |
| 7,966,801 B2 | 6/2011 | Umeh et al. | |
| 7,966,802 B2 | 6/2011 | Szepek et al. | |
| 7,966,804 B2 | 6/2011 | Snow | |
| 7,966,834 B2 | 6/2011 | Myhre | |
| 7,966,995 B2 | 6/2011 | Futa, Jr. et al. | |
| 7,970,570 B2 | 6/2011 | Lynch et al. | |
| 7,975,533 B2 | 7/2011 | Andrie | |
| 7,980,082 B2 | 7/2011 | Ziminsky et al. | |
| 7,983,829 B2 | 7/2011 | Muramatsu et al. | |
| 7,997,083 B2 | 8/2011 | Meadows et al. | |
| 8,001,761 B2 | 8/2011 | Myers, Jr. et al. | |
| 8,005,575 B2 | 8/2011 | Kirchhof | |
| 8,014,929 B2 | 9/2011 | Page et al. | |
| 8,015,791 B2 | 9/2011 | Finkbeiner | |
| 8,015,792 B2 | 9/2011 | Raver | |
| 8,018,590 B2 | 9/2011 | Davis, Jr. et al. | |
| 8,024,934 B2 | 9/2011 | Abreu et al. | |
| 8,024,964 B2 | 9/2011 | Healy et al. | |
| 8,028,512 B2 | 10/2011 | Mendoza et al. | |
| 8,033,117 B2 | 10/2011 | Ziminsky et al. | |
| 8,037,688 B2 | 10/2011 | Hagen et al. | |
| 8,042,340 B2 | 10/2011 | Ma et al. | |
| 8,056,062 B2 | 11/2011 | Bowers et al. | |
| 8,056,317 B2 | 11/2011 | Feiz | |
| 8,061,118 B2 | 11/2011 | Kothnur et al. | |
| 8,068,997 B2 | 11/2011 | Ling et al. | |
| 8,099,181 B2 | 1/2012 | Sterzing et al. | |
| 8,145,403 B2 | 3/2012 | Fuller et al. | |
| 2002/0084702 A1 | 7/2002 | Balas | |
| 2002/0099474 A1 | 7/2002 | Khesin | 700/274 |
| 2002/0107614 A1 | 8/2002 | Tanaka | |
| 2002/0198629 A1 | 12/2002 | Ellis | 700/286 |
| 2003/0009401 A1 | 1/2003 | Ellis | 705/35 |
| 2003/0018394 A1 | 1/2003 | McCarthy et al. | |
| 2003/0036820 A1 | 2/2003 | Yellepeddy et al. | |
| 2003/0037550 A1 | 2/2003 | Fassbender | |
| 2003/0093184 A1 | 5/2003 | Tanaka | |
| 2003/0120444 A1 | 6/2003 | Zison et al. | |
| 2003/0144787 A1 | 7/2003 | Davis, Jr. et al. | |
| 2003/0233831 A1 | 12/2003 | Suenaga et al. | |
| 2004/0011051 A1 | 1/2004 | Ryan et al. | |
| 2004/0025512 A1 | 2/2004 | Davis, Jr. et al. | |
| 2004/0088060 A1 | 5/2004 | Renou et al. | |
| 2004/0102872 A1 | 5/2004 | Schick et al. | 700/286 |
| 2004/0103068 A1 | 5/2004 | Eker et al. | |
| 2004/0128111 A1 | 7/2004 | Lang | |
| 2004/0128266 A1 | 7/2004 | Yellepeddy et al. | |
| 2004/0159142 A1 | 8/2004 | Knott et al. | 73/23.32 |
| 2004/0191914 A1 | 9/2004 | Widmer et al. | 436/55 |
| 2004/0194468 A1 | 10/2004 | Ryan et al. | |
| 2004/0197239 A1 | 10/2004 | Mirkovic et al. | 422/105 |
| 2004/0249515 A1 | 12/2004 | Johnson et al. | |
| 2004/0255595 A1 | 12/2004 | Morgan et al. | |
| 2005/0011179 A1 | 1/2005 | Ooka et al. | |
| 2005/0021710 A1 | 1/2005 | Johnson et al. | 709/223 |
| 2005/0022499 A1 | 2/2005 | Belokon et al. | |
| 2005/0038570 A1 | 2/2005 | Grauer | |
| 2005/0049775 A1 | 3/2005 | Mooney | |
| 2005/0061004 A1 | 3/2005 | Colibaba-Evulet et al. | |
| 2005/0107941 A1 | 5/2005 | Healy | |
| 2005/0114010 A1 | 5/2005 | Healy et al. | |
| 2005/0143865 A1 | 6/2005 | Gardner | |
| 2005/0144955 A1 | 7/2005 | Handelsman et al. | |
| 2005/0159849 A9 | 7/2005 | Johnson et al. | |
| 2005/0160717 A1 | 7/2005 | Sprouse et al. | |
| 2005/0188745 A1 | 9/2005 | Staphanos et al. | 73/23.31 |
| 2005/0203670 A1 | 9/2005 | Kusaka et al. | |
| 2005/0217276 A1 | 10/2005 | Colibaba-Evulet et al. | |
| 2005/0223713 A1 | 10/2005 | Ziminsky et al. | |
| 2005/0247064 A1 | 11/2005 | Lieuwen | |
| 2005/0257514 A1 | 11/2005 | Morgan et al. | |
| 2005/0267642 A1 | 12/2005 | Whiffen et al. | |
| 2005/0268617 A1 | 12/2005 | Amond, III et al. | |
| 2005/0274115 A1 | 12/2005 | Pearce | |
| 2005/0276306 A1 | 12/2005 | Mick et al. | |
| 2005/0278076 A1 | 12/2005 | Barbir et al. | 700/286 |
| 2006/0041368 A1 | 2/2006 | Williams et al. | |
| 2006/0080965 A1 | 4/2006 | Healy | |
| 2006/0106501 A1 | 5/2006 | Gomer et al. | 700/286 |
| 2006/0137353 A1 | 6/2006 | Lieuwen et al. | |
| 2006/0149423 A1 | 7/2006 | Barnicki et al. | 700/286 |
| 2006/0178782 A1 | 8/2006 | Pechtl et al. | |
| 2006/0190139 A1 | 8/2006 | Reaume et al. | |
| 2006/0228596 A1 | 10/2006 | Campbell et al. | |
| 2006/0230743 A1 | 10/2006 | Sprouse et al. | 60/39.37 |
| 2006/0254279 A1 | 11/2006 | Taware et al. | |
| 2006/0260319 A1 | 11/2006 | Ziminsky et al. | |
| 2006/0288706 A1 | 12/2006 | Ziminsky et al. | |
| 2007/0021899 A1 | 1/2007 | Griffin et al. | |
| 2007/0055392 A1 | 3/2007 | D'Amato et al. | |
| 2007/0067068 A1 | 3/2007 | Havlena et al. | |
| 2007/0074519 A1 | 4/2007 | Hadley | 60/776 |
| 2007/0084217 A1 | 4/2007 | Nicholls | |
| 2007/0089425 A1 | 4/2007 | Motter et al. | |
| 2007/0113560 A1 | 5/2007 | Steber et al. | 60/773 |
| 2007/0119147 A1 | 5/2007 | Cornwell et al. | 60/39.281 |
| 2007/0119178 A1 | 5/2007 | Berenbrink et al. | |
| 2007/0125088 A1 | 6/2007 | Kothnur et al. | |
| 2007/0141417 A1 | 6/2007 | Bitoh | 429/23 |
| 2007/0142975 A1 | 6/2007 | Piche | 700/286 |
| 2007/0151252 A1 | 7/2007 | Cornwell et al. | |
| 2007/0151257 A1 | 7/2007 | Maier et al. | |
| 2007/0157620 A1 | 7/2007 | Healy et al. | 60/772 |
| 2007/0157624 A1 | 7/2007 | Bland et al. | |
| 2007/0162189 A1 | 7/2007 | Huff et al. | |
| 2007/0180831 A1 | 8/2007 | Bland | |
| 2007/0186875 A1 | 8/2007 | Jonson | |
| 2007/0198132 A1 | 8/2007 | Yamamoto et al. | 700/286 |
| 2007/0213878 A1* | 9/2007 | Chen | 700/291 |
| 2007/0214796 A1 | 9/2007 | Bland et al. | |
| 2007/0214797 A1 | 9/2007 | Bland et al. | |
| 2007/0214798 A1 | 9/2007 | Frevel | 60/775 |
| 2007/0220896 A1 | 9/2007 | Varatharajan et al. | 60/772 |
| 2007/0227148 A1 | 10/2007 | Bland et al. | |
| 2007/0227155 A1 | 10/2007 | Nemet et al. | |
| 2007/0240648 A1 | 10/2007 | Badami et al. | |
| 2007/0245707 A1 | 10/2007 | Pashley | |
| 2007/0255459 A1 | 11/2007 | Althaus | 700/290 |
| 2007/0267997 A1 | 11/2007 | Kanazawa et al. | |
| 2007/0271024 A1 | 11/2007 | Fujii et al. | |
| 2007/0271927 A1 | 11/2007 | Myers et al. | |
| 2007/0298295 A1 | 12/2007 | Daly et al. | 429/23 |
| 2008/0000214 A1 | 1/2008 | Kothnur et al. | |
| 2008/0004721 A1 | 1/2008 | Huff et al. | |
| 2008/0016875 A1 | 1/2008 | Ryan et al. | |
| 2008/0016876 A1 | 1/2008 | Colibaba-Evulet et al. | 60/776 |
| 2008/0034731 A1 | 2/2008 | Pashley | |
| 2008/0047275 A1 | 2/2008 | Ziminksy et al. | |
| 2008/0071427 A1 | 3/2008 | Szepek et al. | |
| 2008/0083228 A1 | 4/2008 | Myhre | 60/773 |
| 2008/0098746 A1 | 5/2008 | Iasillo et al. | |
| 2008/0118343 A1 | 5/2008 | Arthur et al. | |
| 2008/0134684 A1 | 6/2008 | Umeh et al. | |
| 2008/0141643 A1 | 6/2008 | Varatharajan et al. | 60/39.5 |
| 2008/0154474 A1 | 6/2008 | Iasillo et al. | |
| 2008/0177456 A1 | 7/2008 | Hill et al. | |
| 2008/0177505 A1 | 7/2008 | Volponi | |
| 2008/0243352 A1 | 10/2008 | Healy | 701/100 |
| 2008/0245980 A1 | 10/2008 | Diatzikis | |
| 2008/0260519 A1 | 10/2008 | Dooley | 415/118 |
| 2008/0264034 A1 | 10/2008 | Iya et al. | |
| 2008/0270003 A1 | 10/2008 | Sims et al. | 701/100 |
| 2008/0281483 A1 | 11/2008 | Litt | 701/29 |
| 2008/0281562 A1 | 11/2008 | Chou et al. | 703/1 |
| 2008/0288120 A1 | 11/2008 | Lindenmuth et al. | 700/287 |
| 2008/0288928 A1 | 11/2008 | Bowers | 717/136 |
| 2008/0301499 A1 | 12/2008 | Grichnik | 714/25 |
| 2009/0005950 A1 | 1/2009 | Scalia, Jr. | 701/99 |
| 2009/0005951 A1 | 1/2009 | Frederick et al. | 701/100 |

| | | | | | | |
|---|---|---|---|---|---|---|
| 2009/0005952 A1 | 1/2009 | Tonno et al. ............... 701/100 | | 2010/0286889 A1 | 11/2010 | Childers |
| 2009/0007564 A1 | 1/2009 | Suzuki et al. | | 2010/0286890 A1 | 11/2010 | Chandler |
| 2009/0037036 A1 | 2/2009 | Nguyen et al. | | 2010/0287943 A1 | 11/2010 | McMahan et al. |
| 2009/0042151 A1 | 2/2009 | Joklik et al. ...................... 431/4 | | 2010/0287947 A1 | 11/2010 | Rogers et al. |
| 2009/0043485 A1 | 2/2009 | Banks | | 2010/0300108 A1 | 12/2010 | Demougeot et al. |
| 2009/0044513 A1 | 2/2009 | Fuller et al. ................. 60/39.281 | | 2010/0301615 A1 | 12/2010 | Yamashita et al. |
| 2009/0046762 A1 | 2/2009 | Henshaw et al. ............. 374/179 | | 2010/0307157 A1 | 12/2010 | Bilton et al. |
| 2009/0055070 A1 | 2/2009 | De et al. | | 2010/0307158 A1 | 12/2010 | Bilton et al. |
| 2009/0055071 A1 | 2/2009 | Way et al. | | 2010/0313572 A1 | 12/2010 | McManus et al. |
| 2009/0055130 A1 | 2/2009 | Pandey et al. ................. 702/183 | | 2010/0326080 A1 | 12/2010 | Rogers et al. |
| 2009/0055145 A1 | 2/2009 | Volponi et al. .................... 703/7 | | 2011/0004356 A1 | 1/2011 | Garcia |
| 2009/0071118 A1 | 3/2009 | Ma et al. ........................ 60/39.26 | | 2011/0004390 A1 * | 1/2011 | Nomura et al. ............... 701/100 |
| 2009/0071442 A1 | 3/2009 | Emo et al. ...................... 123/446 | | 2011/0048022 A1 | 3/2011 | Singh et al. |
| 2009/0082919 A1 | 3/2009 | Hershey et al. ................. 701/35 | | 2011/0052370 A1 | 3/2011 | Karpman et al. |
| 2009/0105852 A1 | 4/2009 | Wintrich et al. ................ 700/29 | | 2011/0054704 A1 | 3/2011 | Karpman et al. |
| 2009/0112441 A1 | 4/2009 | Perschi et al. ................. 701/103 | | 2011/0056181 A1 | 3/2011 | Dinu |
| 2009/0125207 A1 | 5/2009 | Nomura et al. ............... 701/100 | | 2011/0077783 A1 | 3/2011 | Karpman et al. |
| 2009/0132145 A1 | 5/2009 | Angeby ......................... 701/102 | | 2011/0079015 A1 | 4/2011 | Geis et al. |
| 2009/0138170 A1 | 5/2009 | Nemet et al. .................. 701/100 | | 2011/0079020 A1 | 4/2011 | Durocher et al. |
| 2009/0141349 A1 | 6/2009 | Myhre ........................... 359/507 | | 2011/0137536 A1 | 6/2011 | Tonno et al. |
| 2009/0142717 A1 | 6/2009 | Lavelle .......................... 431/12 | | 2011/0138766 A1 | 6/2011 | ELKady et al. |
| 2009/0150040 A1 | 6/2009 | Rofka ............................ 701/100 | | 2011/0138813 A1 | 6/2011 | Sandvik et al. |
| 2009/0182441 A1 | 7/2009 | Wintrich et al. ................ 700/44 | | 2011/0146232 A1 | 6/2011 | Westervelt et al. |
| 2009/0183551 A1 | 7/2009 | Fattic et al. ................... 73/23.31 | | 2011/0153295 A1 | 6/2011 | Yerramalla et al. |
| 2009/0193788 A1 | 8/2009 | Szepek et al. | | 2011/0154263 A1 | 6/2011 | Iwasaki et al. |
| 2009/0222187 A1 | 9/2009 | Martling et al. | | 2011/0154828 A1 | 6/2011 | Iwasaki et al. |
| 2009/0223210 A1 | 9/2009 | Klejeski et al. | | 2011/0156391 A1 | 6/2011 | Kirchner et al. |
| 2009/0223225 A1 | 9/2009 | Kraemer et al. | | 2011/0160979 A1 | 6/2011 | Muller |
| 2009/0226327 A1 | 9/2009 | Little et al. | | 2011/0172893 A1 | 7/2011 | Nomura et al. |
| 2009/0234554 A1 | 9/2009 | Buehman | | 2011/0179802 A1 | 7/2011 | Snider et al. |
| 2009/0265049 A1 | 10/2009 | Wise et al. | | 2011/0191004 A1 | 8/2011 | Nomura et al. |
| 2009/0266150 A1 | 10/2009 | Novis | | 2011/0196593 A1 | 8/2011 | Jiang et al. |
| 2009/0271149 A1 | 10/2009 | Brown | | 2011/0197594 A1 | 8/2011 | Khosla et al. |
| 2009/0271340 A1 | 10/2009 | Schneegass et al. | | 2011/0214644 A1 | 9/2011 | Barta et al. |
| 2009/0292437 A1 | 11/2009 | Cloft | | 2011/0215775 A1 | 9/2011 | Engelhardt et al. |
| 2009/0293597 A1 | 12/2009 | Andrie | | 2011/0224959 A1 | 9/2011 | Zhang et al. |
| 2009/0301097 A1 | 12/2009 | Deuker et al. | | 2011/0225976 A1 | 9/2011 | Ziminsky et al. |
| 2009/0313056 A1 | 12/2009 | Beekhuis | | 2011/0239621 A1 | 10/2011 | Meneely et al. |
| 2009/0320492 A1 | 12/2009 | Carin et al. | | 2011/0247314 A1 | 10/2011 | Chila et al. |
| 2009/0326781 A1 | 12/2009 | Mukavetz et al. | | 2011/0247406 A1 | 10/2011 | Grosse-Laxzen et al. |
| 2009/0326782 A1 | 12/2009 | Nunn | | 2011/0262334 A1 | 10/2011 | Kraemer et al. |
| 2009/0326784 A1 | 12/2009 | Tanner et al. | | 2011/0265487 A1 | 11/2011 | Gauthier et al. |
| 2010/0011851 A1 | 1/2010 | Healy et al. | | 2011/0270502 A1 | 11/2011 | Demougeot et al. |
| 2010/0018183 A1 | 1/2010 | Feiz | | 2011/0270503 A1 | 11/2011 | Stuttaford et al. |
| 2010/0024393 A1 | 2/2010 | Chi et al. | | 2011/0277482 A1 | 11/2011 | Mosley et al. |
| 2010/0024536 A1 | 2/2010 | Adibhatla et al. | | 2011/0277539 A1 | 11/2011 | Meerbeck et al. |
| 2010/0031633 A1 | 2/2010 | Kitazawa | | 2011/0289932 A1 | 12/2011 | Thompson |
| 2010/0034635 A1 | 2/2010 | Erickson et al. | | 2011/0289934 A1 | 12/2011 | Desabhatla |
| 2010/0042367 A1 | 2/2010 | Brown | | | | |
| 2010/0050591 A1 | 3/2010 | Nemet et al. | | | | |

FOREIGN PATENT DOCUMENTS

| | | |
|---|---|---|
| GB | 2 272 783 | 5/1994 |
| JP | 61036809 | 2/1986 |
| JP | 08-042361 | 2/1996 |
| JP | 2006-144796 | 6/2006 |
| JP | 2007-138949 | 6/2007 |
| JP | 2009-296994 | 12/2009 |
| JP | 2010-103781 | 5/2010 |
| JP | 2010-159954 | 7/2010 |
| RU | 2 162 953 | 2/2001 |
| RU | 2 252 328 | 5/2005 |
| RU | 2 280 775 | 7/2006 |
| RU | 2 287 074 | 11/2006 |
| RU | 2 322 601 | 4/2008 |

OTHER PUBLICATIONS

Bland, R., Ryan, W., Abou-Jaoude, K., Bandaru, R., Harris, A., Rising, B., "Siemens W501F Gas Turbine: Ultra Low NOx Combustion System Development," Siemens Westinghouse, 2004.

Sébastien Candel, "Combustion dynamics and control: Progress and challenges," Proceedings of the Combustion Institute, vol. 29, Issue 1, 2002, pp. 1-28.

Yoshi Usune, Masao Terazaki, Yasuoki Tomita, Jun-Hee Lee, "Technical Approach to Higher Availability of Gas Turbine Combined Cycle".

Andersen, Helmer, "Early Detection of Combustor Pulsations and Optimized Operation Through On-Line Monitoring Systems," International Gas Turbine and Aeroengine Congress and Exhibition, May 2000.

Frank J. Brooks, "GE Gas Turbine Performance Characteristics," GE Power Systems, GER-3567H, Oct. 2000.

Corbett, N.C., "Remote Monitoring and Control of Advanced Gas Turbines," Computing & Control Engineering Journal, Apr. 2001.

Jeffrey D. Willis and A. John Moran, "Industrial RB211 DLE Gas Turbine Combustion Update," Proceedings of ASME TURBOEXPO, 2000.

Thomas Scarinci and John L. Halpin, "Industrial Trent Combustor—Combustion Noise Characteristics," International Gas Turbine & Aeroengine Congress & Exhibition, 1999.

Yukimoto et al. "A new PID controller tuning system and its application to a flue gas temperature control in a gas turbine power plant," Control Applications [Online] 1998, 2, pp. 1373-1377.

Angello, L., "Tuning Approaches for DLN Combustor Performance and Reliability" Technical Update, Electric Power Research Institute (EPRI), Mar. 2005.

John Xia and Rick Antos, "SGT6-5000F (W501F) 3 Million Hours Fleet Operational Experience," Power-Gen International 2006—Orlando, FL, Nov. 2006.

* cited by examiner

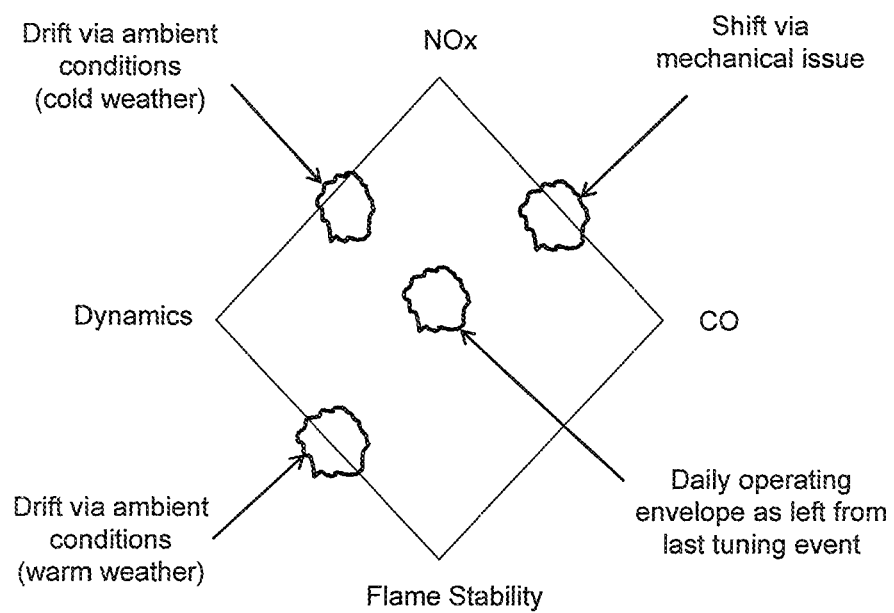

AUTOMATED TUNING OF GAS TURBINE COMBUSTION SYSTEMS

TECHNICAL FIELD

The present invention relates to an automated system to sense the operating condition of a combustion system and to make preset adjustments to achieve desired operation of the turbine.

BACKGROUND

Lean premixed combustion systems have been deployed on land based gas turbine engines to reduce emissions, such as NOx and CO. These systems have been successful and, in some cases, produce emission levels that are at the lower limits of measurement capabilities, approximately 1 to 3 parts per million (ppm) of NOx and CO. Although these systems are a great benefit from a standpoint of emission production, the operational envelope of the systems is substantially reduced when compared to more conventional combustion systems. As a consequence, the control of fuel conditions, distribution and injection into the combustion zones has become a critical operating parameter and requires frequent adjustment, when ambient atmospheric conditions, such as temperature, humidity and pressure, change. The re-adjustment of the combustion fuel conditions, distribution and injection is termed tuning.

Controlled operation of a combustion system generally employs a manual setting of the operational parameters of a combustor at an average operational condition. These settings are satisfactory at the time of the setup, but conditions may change and cause an unacceptable operation in a matter of hours or days. Other approaches use a formula to predict emissions based on gas turbine operating parameters and select a set point for fuel distribution and/or overall machine fuel/air ratio, without modifying other parameters, such as fuel gas temperature. These approaches do not allow for timely variation, do not take advantage of actual dynamics and emission data or do not modify fuel distribution, fuel temperature and/or other turbine operating parameters.

Another variable that impacts the lean premixed combustion system is fuel composition. Sufficient variation in fuel composition will cause a change in the heat release of the lean premixed combustion system. Such change may lead to emissions excursions, unstable combustion processes, or even blow out of the combustion system.

Mis-operation of the combustion system manifests itself in augmented pressure pulsations or an increase in combustion dynamics. Pulsations can have sufficient force to destroy the combustion system and dramatically reduce the life of combustion hardware. Additionally, improper tuning of the combustion system can lead to emission excursions and violate emission permits. Therefore, a means to maintain the stability of the lean premixed combustion systems, on a regular or periodic basis, within the proper operating envelope, is of great value and interest to the industry. Additionally, a system that operates by utilizing near real-time data, taken from the turbine sensors, would have significant value to coordinate modulation of fuel distribution, fuel gas inlet temperature and/or overall machine fuel/air ratio.

SUMMARY OF THE INVENTION

The present invention is a controller and method for tuning the operation of a gas turbine of the type having sensors for measuring operational parameters of the turbine and controls for controlling various operational elements of the turbine. The operational parameters of the turbine which are received by the controller may include one or more of the following: combustor dynamics, turbine exhaust temperature (overall fuel/air ratio) and turbine exhaust emissions. The operational control elements may include one of more of the following: fuel distribution, fuel temperature and turbine exhaust temperature. The turbine/power plant system also includes a communication link, such as a distributed control system (DCS). The link permitting communication with the sensors and the operational controls. The tuning controller is also connected to the turbine system through the communication link.

The controller operates by receiving data from the sensors. Operational priorities for the turbine may be set within the controller and are typically selected from optimum NOx emissions, optimum power output and/or optimum combustor dynamics. The data received from the turbine sensors is compared to stored operational standards within the controller. The selected operational standards are preferably based on the set operational priorities. A determination is made as to whether the turbine operation conforms to the operational standards. In addition, upon the data being determined to be out of conformance, a further determination is made of the dominant turning criteria again. This further determination is preferably based on the preset operational priorities. Once the logical determinations are made, the tuning controller communicates with the operational control means through the communication link to perform a selected adjustment in an operational parameter of the turbine. The selected operational adjustment is preferably based on the dominant tuning criteria and has a preset fixed incremental value and defined value range. Each incremental change is preferably input over a set period of time, which is sufficient for the turbine to gain operational stability. Once the time period passes, operational data is again received from the turbine sensor means to determine if an additional incremental change is desired. Upon completing the adjustments within a defined range, a further operational parameter adjustment is selected, again preferably based on the dominant tuning criteria, and a further fixed incremental adjustment is made. The tuning process continues by the controller receiving operational data to determine if the operation is conforming to the operational standards or whether an additional adjustment is required. The operational parameters being adjusted by the tuning controller may include one or more of the following: the combustor fuel distribution split within the nozzles of the combustor, the fuel gas inlet temperature, and/or the fuel/air ratio within the turbine.

In a further aspect of the invention, the system performs a method for determination of the dominant gas turbine combustion system tuning scenario through the use of Boolean hierarchical logic and multiple levels of control settings.

In another aspect of the invention, the method performed relates to and automated control of the gas turbine inlet fuel temperature through automated modification of the fuel gas temperature control set point within a Distributed Control System (DCS).

In a still further aspect of the invention, a, method for automated control of a gas turbine inlet fuel temperature is defined by automated modification of the fuel gas temperature control set point within the fuel gas temperature controller.

In another aspect of the invention a method for communicating turbine control signals to a gas turbine controller is accomplished through the use of an existing gas turbine communication link with an external control device, such as, for example a MODBUS Serial or Ethernet communication protocol port existing on the turbine controller for communication with the a Distributed Control System (DCS).

In a still further aspect of the invention a method for modification of a gas turbine combustion system is defined by a series of auto tuning settings via a user interface display, which utilizes Boolean-logic toggle switches to select user-desired optimization criteria. The method is preferably defined by optimization criteria based on Optimum Combustion Dynamics, whereby toggling of this switch changes the magnitude of the combustor dynamics control setting(s).

BRIEF DESCRIPTION OF DRAWINGS

For the purpose of illustrating the invention, the drawings show forms that are presently preferred. It should be understood that the invention is not limited to the precise arrangements and instrumentalities shown in the drawings of the present invention.

FIGS. 9A and 9B are schematic representations of the function of the tuning controller of the present invention in maintaining the tuning of the turbine system.

DETAILED DESCRIPTION

Figure 1:
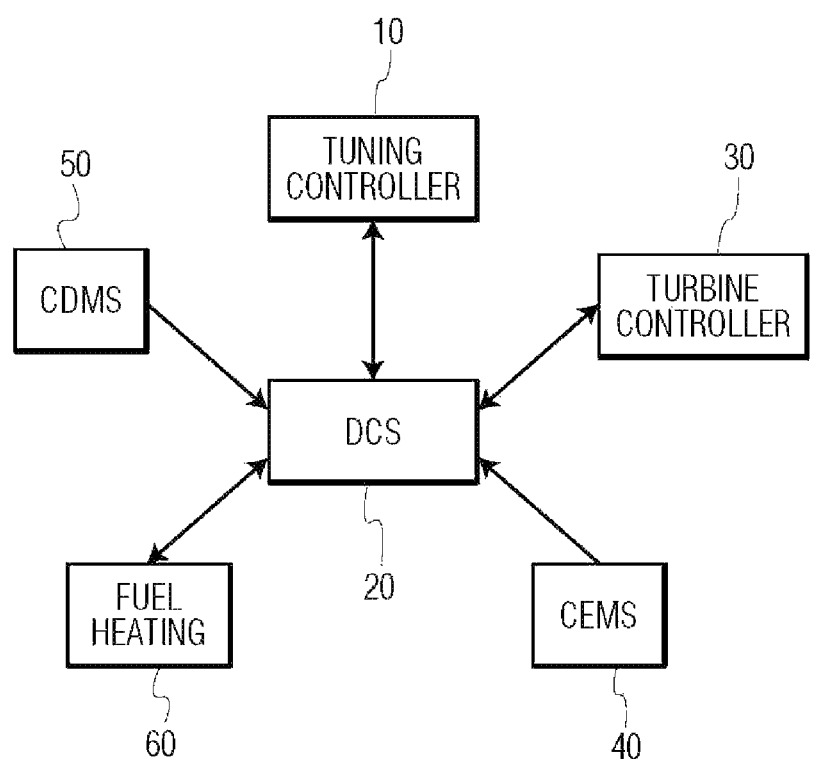
FIG. 1 shows a schematic representation of an operational plant communication system encompassing the gas turbine engine system, incorporating a gas turbine tuning controller.

FIG. 1 is a communication diagram for a gas turbine engine (not shown), within which a tuning controller 10 of the present invention operates. A communication link or hub is provided to direct communication between various elements of the turbine system. As shown, the communication link is a Distributed Control System (DCS) identified by the numeral 20. Most of the turbine control is performed through the DCS 20. A turbine controller 30 communicates directly with the gas turbine and with the DCS 20. In the present invention, information relevant to turbine operation, e.g., turbine dynamics, turbine exhaust emissions, etc. are directed through the DCS 20 to the tuning controller 10. The tuning controller 10 is contemplated to be a stand-alone PC used to run as a programmable logical controller (PLC). The tuning controller 10 is preferably a separate computer from the turbine controller 30 and does not communicate directly with the turbine controller 30, except through the DCS 20. The signals from the tuning controller 10 may be transferred to the turbine controller 30 or other controls within the system by the use of an external control device, such as a MODBUS Serial or Ethernet communication protocol port existing on or added to the system.

The relevant operational data is received from sensor means associated with the turbine. For example, the turbine exhaust emission reading is taken from stack emissions by a continuous emissions monitoring system (CEMS) 40, which is connected to the DCS. Combustion dynamics is sensed using a dynamic pressure sensing probe located within the combustion region of the turbine combustor. As shown, a continuous dynamics monitoring system (CDMS) 50 is provided and communicates with the DCS. The CDMS 50 preferably uses either direct mounted or wave guide connected pressure or light sensing probes to measure the combustion dynamics. Another relevant operational parameter is the fuel gas temperature. Again, this temperature information is directed to the tuning controller 10 through the DCS 20 from the fuel heating unit 60. Since part of the tuning operation may include adjustment of the fuel temperature, there may be a two-way communication between the tuning controller 10 and the fuel heating unit 60.

Relevant operational data from the turbine is collected several times per minute. This data collection allows for near real-time system tuning. Most relevant turbine operational data is collected by the tuning controller in near real-time. However, the turbine exhaust emissions is typically received from the sensor by the tuning controller 10 with a 2 to 8 minute time lag from current operating conditions. This time lag necessitates the need for the tuning controller 10 to receive and buffer relevant information, for a similar time lag, before making operational tuning adjustments. The tuning controller 10 tuning adjustment time lag assures that all of the operational (including exhaust emissions) data is representative of a stable turbine operation before and after any adjustments have been made. Once the data is deemed stable, the tuning controller 10 determines whether there is a need for adjustment of tuning parameters. If no adjustment is necessary, the tuning controller 10 maintains the current tuning and waits to receive the next data set. If changes are desired, tuning commences.

All determinations of the need for turbine tuning are performed within the tuning controller 10. The tuning operation is started based on an "alarm" created by receipt of operational data outside of preset operational criteria. In order for the tuning operation to be initiated, the alarm—and thus the data anomaly—must continue for a predetermined period of time.

One example of a tuning adjustment is the variation of the fuel nozzle pressure ratio to adjust combustion dynamics. With the requirement of higher firing temperatures to achieve greater flame temperatures and efficiency, turbine combustors must release more energy in a given combustor volume. Better exhaust emissions are often achieved by increasing the mixing rate of fuel and air upstream of the combustion reaction zone. The increased mixing rate is often achieved by increasing the pressure drop at the fuel nozzle discharge. As the mixing rate increases in combustors, the turbulence generated by combustion often leads to noise within the combustor and may lead to the generation of acoustic waves. Typically, acoustic waves are caused when the sound waves of the combustion flames are coupled with the acoustic characteristics of the combustor volume or the fuel system itself.

Acoustic waves may affect the internal pressure in the chamber. Where pressure near a fuel nozzle rises, the rate of fuel flowing through the nozzle and the accompanying pressure drop decreases. Alternatively, a decrease in pressure near the nozzle will cause an increase in fuel flow. In cases where a low fuel nozzle pressure drop allows fuel flow oscillation, a combustor may experience amplified pressure oscillations. To combat the pressure oscillations within the combustor, combustion dynamics are monitored and the fuel air ratio and fuel nozzle pressure ratio may be modified to reduce or eliminate unwanted variations in combustor pressure, thereby curing an alarm situation or bringing the combustion system back to an acceptable level of combustion dynamics.

Figure 2:
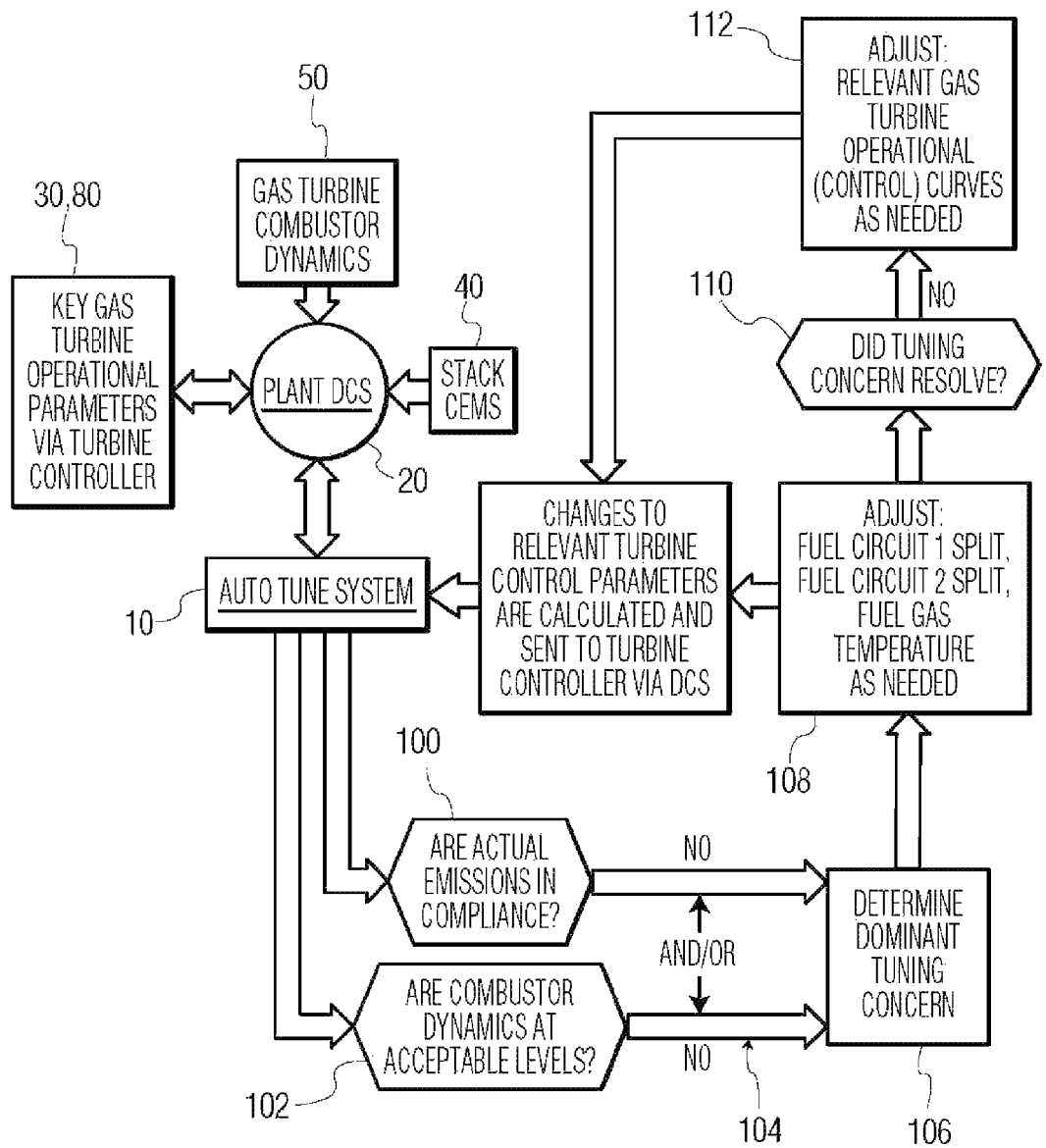
FIG. 2 shows a functional flow chart for a tuning controller of the present invention.

As shown in FIG. 2, the data received from the sensing means for the combustor dynamics (50), turbine exhaust emissions (40), and other relevant turbine operating parameters (30) are directed through the DCS 20 to the tuning controller 10. These input values are then compared to standard or target operational data for the turbine. The stored operational standards are based, at least in part, on the operational priority settings for the turbine. These priority settings are defined on the main user interface 12 of the tuning controller 10 and are shown graphically in FIG. 3. Based on the priority settings, a series of adjustments are made to the operation of the turbine by the turbine controller 10 connected through the DCS 20. The adjustments are directed to the control means, including the fuel heating unit 60 (FIG. 1) and various other operational elements 80 of the turbine (FIG. 2).

Figure 3:
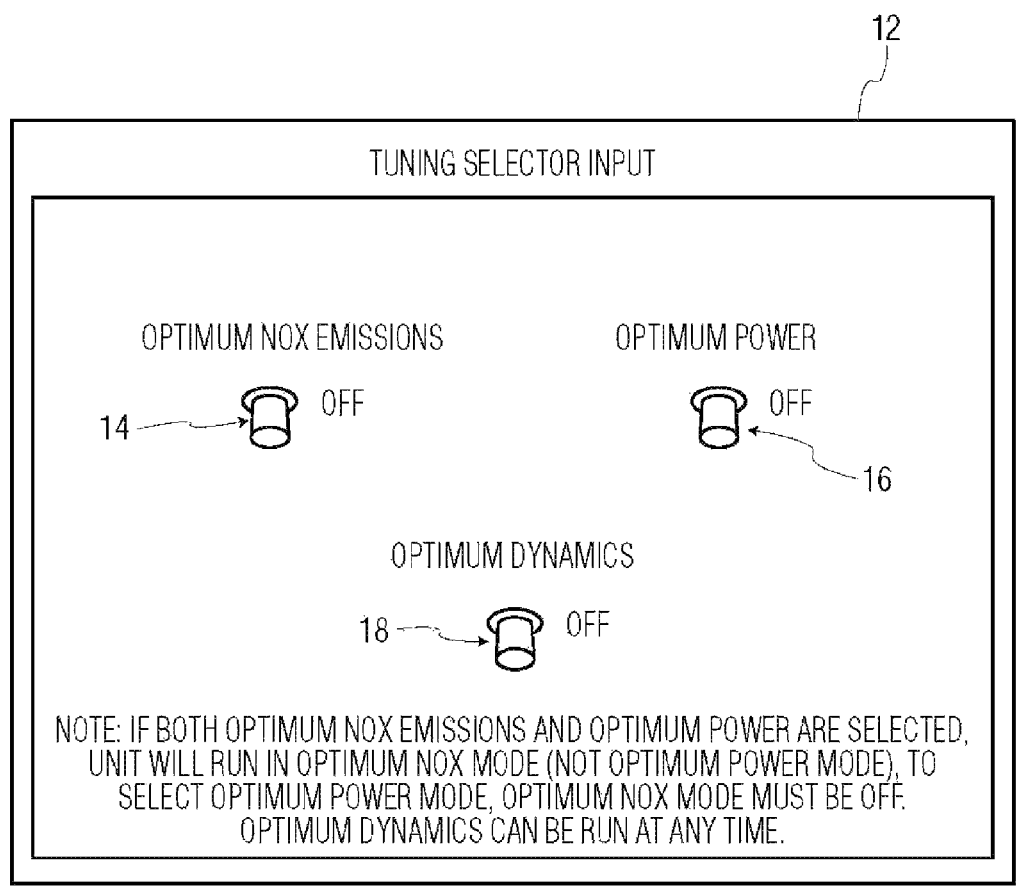
FIG. 3 shows a user interface display for selecting the optimization mode within the present invention.
Figure 4:
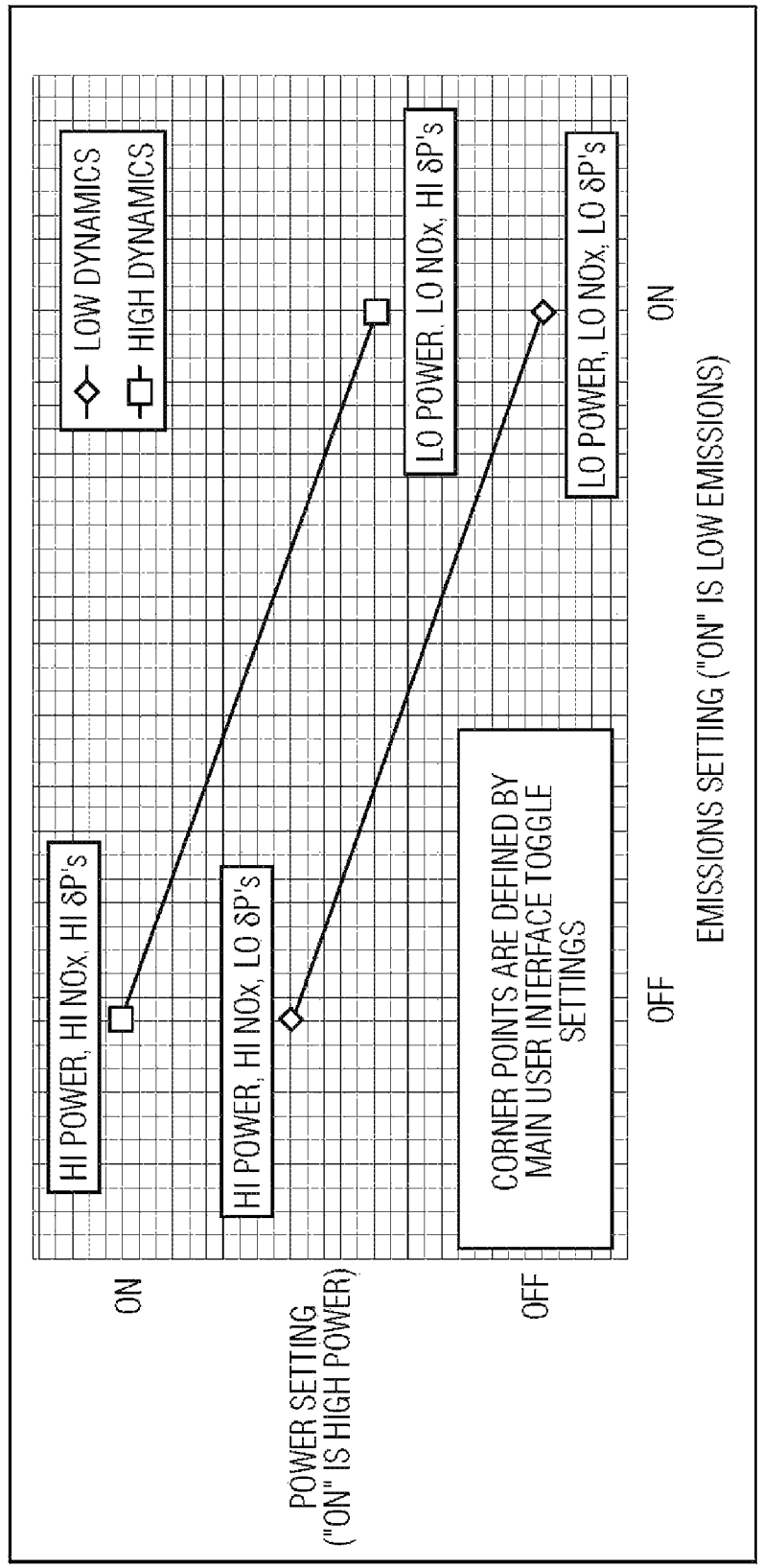
FIG. 4 shows a schematic of the inter-relationship of various optimization mode settings.

The interface display 12 shown in FIG. 3 is comprised of switches (each having an On/Off indication). These switches allow the user to specify the desired tuning priorities for the operation of the turbine. The switched operational priorities include optimum NOx emissions 14, optimum power 16 and optimum combustor dynamics 18. Each of these switches is set by the user to adjust the preferred operation of the turbine. Within the tuning controller are functions that operate within the priorities set by the switches. Preferably, if both the optimum NOx emissions switch 12 and the optimum power switch 14 are set to "On", the controller 10 will run in the optimum NOx mode, not optimum power. Thus, to run in optimum power mode, the optimum NOx emissions switch 12 must be "Off". FIG. 4 shows a graphical representation of the interrelationship of the interface display switches.

Returning to FIG. 2, there is shown a representation of the logical flow of the determinations and calculations made within the tuning controller 10. The tuning controller 10 receives the actual operating parameters of the turbine through the turbine controller 30, combustor dynamics through the CDMS 50, and the turbine exhaust emissions through the CEMS 40. This sensor data is directed to the tuning controller 10 through the DCS 20. The received sensor data is compared to stored operational standards to determine if the turbine operation is conforming to the desired settings. The operational standards are based on the preset operational priorities of the turbine, defined by the switches 14, 16, 18 on the main user interface display 12 of the tuning controller 10 (FIG. 3).

Based on the preset operational priorities, a hard-coded hierarchical Boolean-logic approach determines the dominant tuning criteria based on operational priorities. From this logical selection, the tuning controller 10 implements a fixed incremental adjustment value for changing an operational parameter of the turbine within a maximum range of adjustment (e.g., high and low values). The tuning changes are made in a consistent, pre-determined direction over a pre-determined increment of time and are dependant on the dominant tuning criteria at present. It is contemplated that no formulaic or functional calculations are made to determine tuning adjustments; rather, the incremental adjustments, the direction of the adjustments, the time span between adjustments, and the maximum range for the adjustments for each parameter and for each tuning criteria are stored in the tuning controller 10.

As shown in FIG. 2, the tuning controller 10 determines whether the emissions are in compliance 100 and whether the combustor dynamics are at acceptable levels 102. If both are in compliance with the set operational standards, the tuning controller 10 waits for the next data set from the CEMS 40 or the CDMS 50, or for other operational data 80. If the received data is non-conforming with the operational standards 104, the tuning operation moves to the next tuning step. The logical adjustment of turbine operation is defined by the dominant tuning criteria 106, which is based at least in part on the preset operational priorities set within the user interface 12.

In a preferred operation, the tuning controller 10 will first attempt to change the turbine combustor fuel splits 108. The fuel split determines the distribution of the fuel flow to the fuel nozzles in each combustor. If these adjustments do not resolve the tuning issue and do not place the operational data back into conformance with the operational standards, a further adjustment is performed. In certain situations, the next incremental adjustment may be a change of the fuel gas temperature set point. In this adjustment step, the tuning controller 10 sends a modified fuel gas inlet temperature signal to the DCS 20, which is directed to the fuel heating unit 60.

If modification of the combustor fuel splits and/or fuel gas inlet temperature does not resolve the tuning issue 110, the tuning controller 10 will then alter the overall fuel/air ratio 112. This approach makes changes to the turbine thermal cycle utilizing fixed incremental changes over pre-determined amounts of time. This step is intended to adjust the exhaust temperature (up or down) by adjusting the air to fuel ratio in accordance with predetermined, standard control curves for the turbine operation, which are maintained within the memory of the tuning controller 10.

In the present invention, it is contemplated that all control changes directed by the tuning controller are fed back to the turbine system through the DCS. These changes are implemented directly within the various controller means within the system or through the turbine controller. When the operational data is returned to the desired operational standards, the tuning settings are held in place by the tuning controller pending an alarm resulting from non-conforming data received from the sensor means through the DCS.

The adjustments sent from the tuning controller to the turbine controller or the associated controller means are preferably fixed in magnitude. Thus, the adjustments are not recalculated with new data or optimized to a target. The adjustments are part of an "open loop". Once started, the adjustments move incrementally to the preset maximum or maximum within a specified range, unless an interim adjustment places the operation data into conformance with the operational standards. Under most circumstances, when the fall incremental range for one operational parameter is completed, the tuning controller moves on to the next operational parameter, which is defined by the preset operational priorities. The logic of the tuning controller drives the operational parameter adjustment based on a "look-up" table stored within the memory of the tuning controller and preset operational priorities.

The tuning controller preferably addresses one operational parameter at a time. For example, the dominant tuning criteria dictates the first adjustment to be made. In the preferred example discussed above, the fuel distribution/split parameter is first adjusted. As indicated in FIG. 2, the fuel split of fuel circuit 1—the center nozzle in the combustor—is first addressed, followed by the split for fuel circuit 2—the outer nozzles in the combustor. The fuel gas inlet temperature adjustment generally follows the fuel split adjustments when needed. Within each step, there is an incremental adjustment, followed by a time lag to permit the adjusted turbine operation to stabilize. After the time lag, if the current operational data analyzed by the tuning controller indicates that turbine operation still remains outside of the operational standards, the next incremental adjustment is made. This pattern repeats for each step. Under most circumstances, only when one adjustment step is completed does the tuning controller move onto the next operational parameter.

The tuning controller preferably controls combustion operation to maintain proper tuning in variable conditions of ambient temperature, humidity and pressure, all of which vary over time and have a significant effect on turbine operation. The tuning controller may also maintain the tuning of the turbine during variation in fuel composition. Variation in fuel composition may cause a change in the heat release, which can lead to unacceptable emissions, unstable combustion, or even blow out. The tuning controller preferably does not serve to adjust fuel composition to compensate; rather, it tunes the operational parameters (fuel gas distribution, fuel gas inlet temperature, and/or turbine fuel/air ratio) to address the effects on combustion output and discharge.

In other tuning dynamics, an alternate order for the adjustments is contemplated. For example, if the dominant operational priority is optimum NOx emissions, the fuel temperature adjustment may be skipped, going directly to the operational control curves. If, however, dynamics is the operational priority (and the optimum NOx emission switch 14 is Off), the incremental fuel temperature adjustment may be performed before going to the operational control curves. Alternatively, the step of making adjustments in accordance with the operational control curves may be turned off completely.

Figure 5:
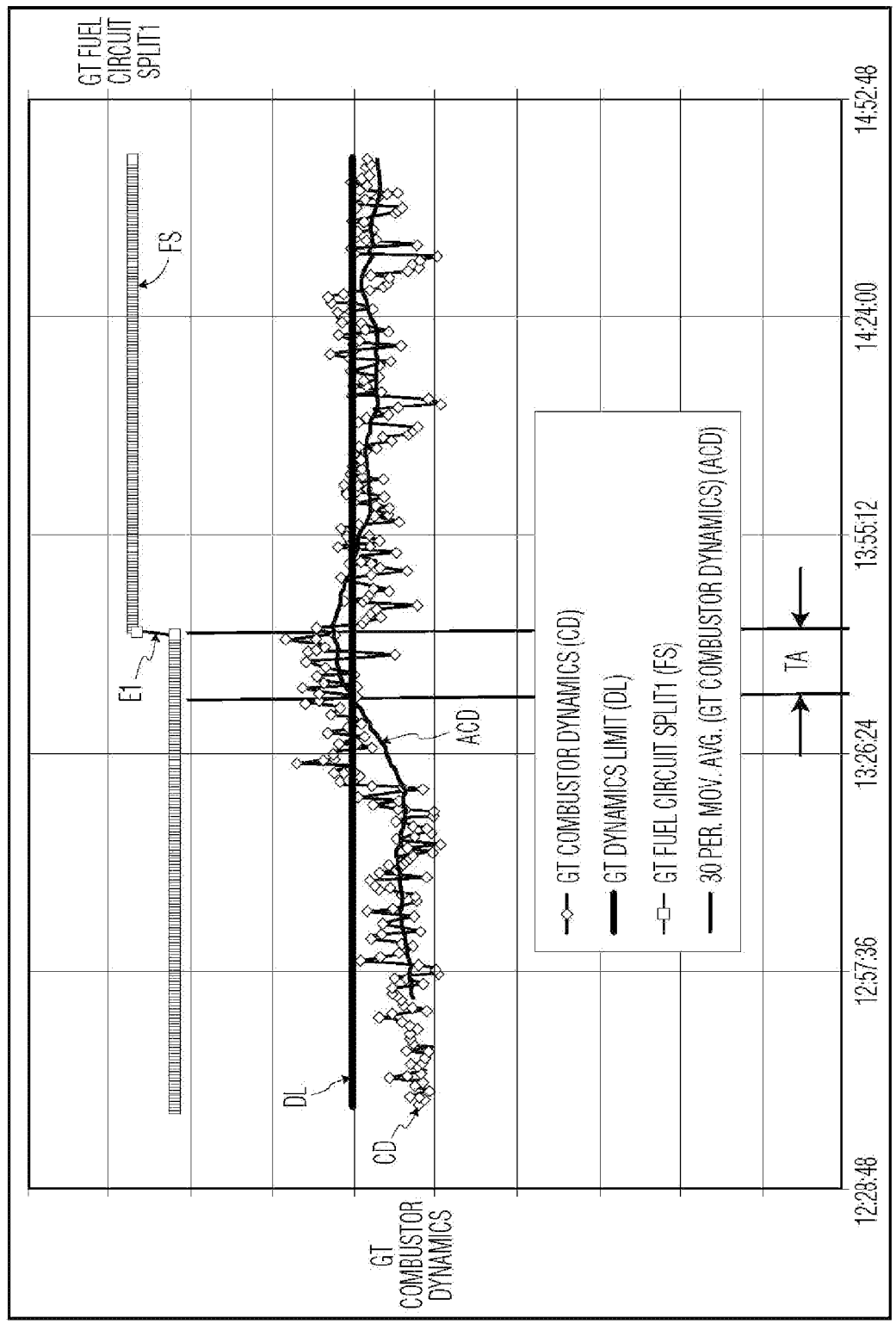
FIGS. 5-8 show operational examples of operational tuning of a gas turbine engine system as contemplated by the present invention.

In FIGS. 5-8, there is shown various operational examples of the tuning operation of a tuning controller of the present invention based on operational data from a running turbine system. In FIG. 5, a change in the combustor fuel split is accomplished in reaction to a dynamics alarm is generated when the combustor dynamics moves outside of the set operational priorities for optimum dynamics. The actual combustor dynamics data received from, for example, the CDMS 50 is designated as CD in the graph. The moving average for the combustor dynamics is identified in the graph as ACD. When the combustor dynamics exceeds the dynamics limit value DL for a set period of time TA an alarm goes off within the tuning controller. This alarm causes the first event E1 and a resulting incremental adjustment in the combustor fuel split tuning parameter. As illustrated, the incremental increase in the fuel split causes a corresponding drop in the combustor dynamics CD, with the average combustor dynamics ACD dropping below the dynamics alarm limit DL. As time continues, the tuning is held by the tuning controller and the average combustor dynamics ACD maintains its operational position below the dynamics limit DL. Thus, no further adjustments necessary or alarms issued.

Figure 6:
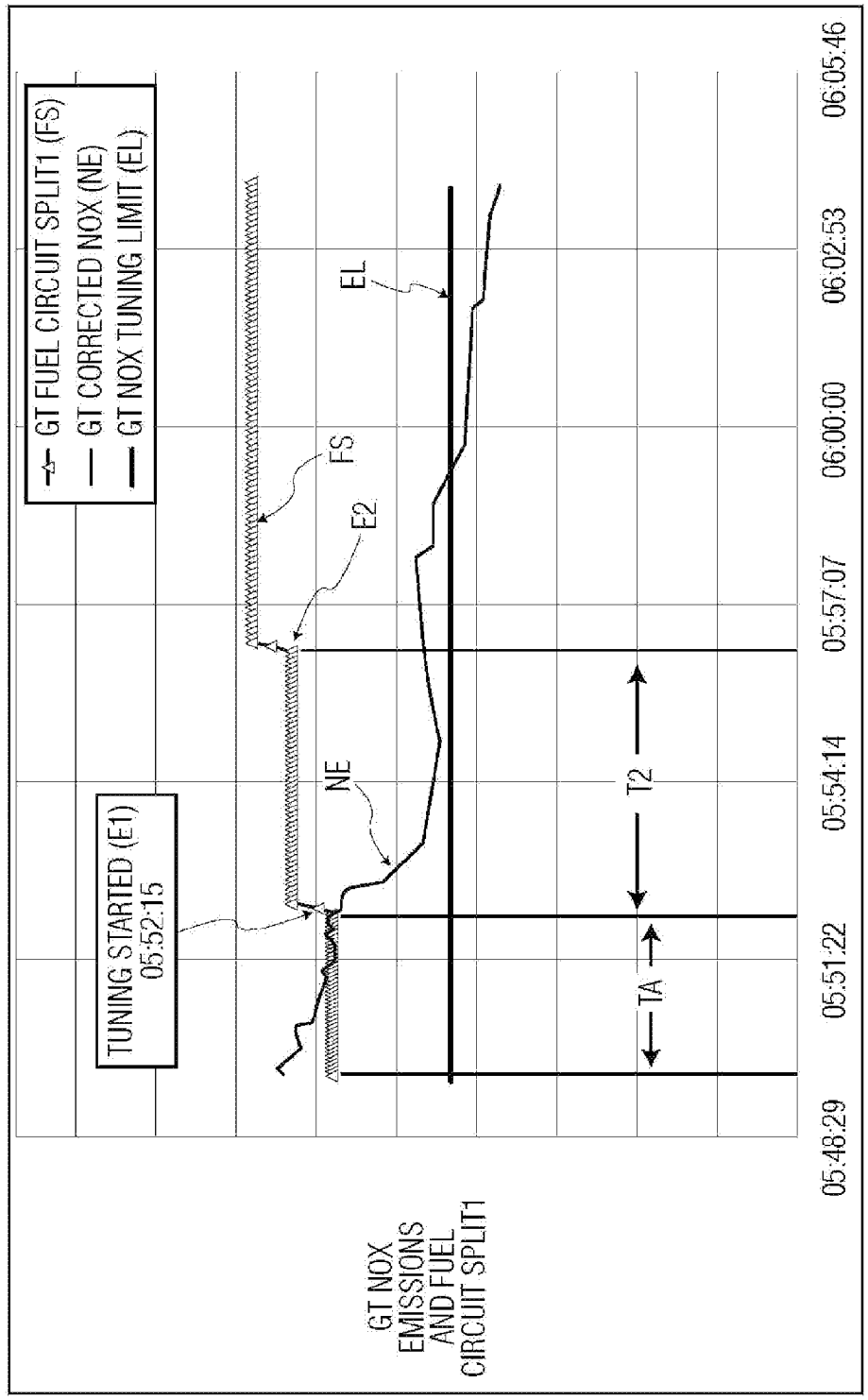

In FIG. 6, the tuning criteria is NOx emissions. As NOx emissions data NE is received from the tuning controller, an alarm is generated after the passage of time TA. The alarm is caused by the NOx emissions NE exceeding the operational standard or tuning limit EL. The alarm activates a first event E1 resulting in an incremental increase in the fuel split FS. After a period of time T2 from the first event E1, the NOx alarm is still activated due to the NOx emissions NE exceeding the preset tuning limit EL. This continued alarm after time T2 causes a second event E2 and a second incremental increase in the fuel split value FS. This second increase is equal to the first incremental increase. The second event E2 causes the NOx emissions NE to drop below the preset limit EL within the review time period and halts the alarm. As the NOx emissions NE remains below the limit EL, the fuel split FS tuning is held and the operation of the turbine continues with the defined operational parameters.

Figure 7:
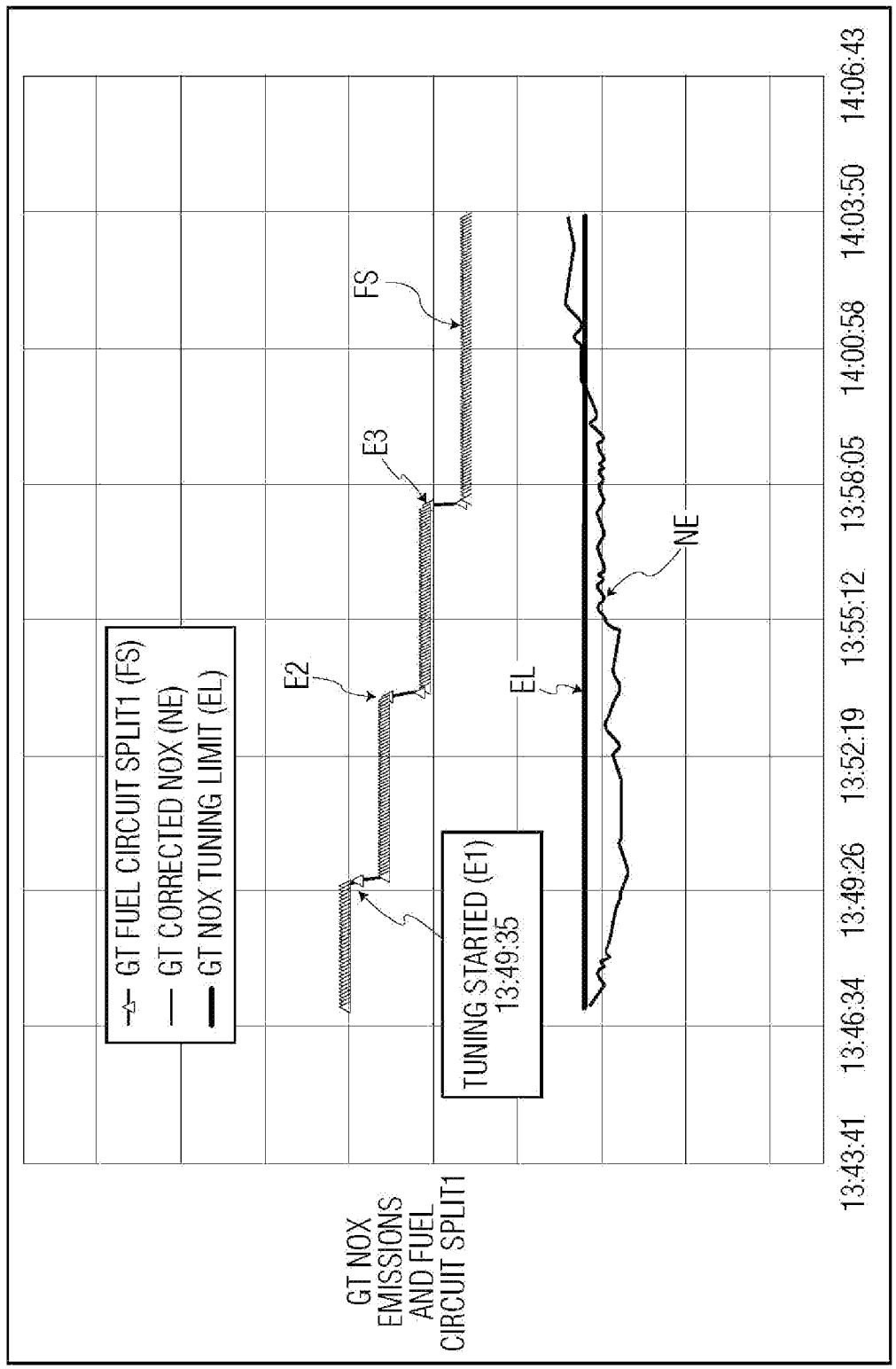

In FIG. 7, the tuning criteria is again NOx emissions, with the alarm created by a low reading received by tuning controller. As shown, the NOx tuning limit NL is defined. Upon passage of the set time period from receiving data, the alarm is generated and a first event E1 occurs. At the first event E1, the fuel split is incremental adjust downward. After a set passage of time from event E1 additional emissions data NE is received and compared to the preset limit EL. Because the NOx is still below the alarm level EL, a second event E2 occurs resulting in a further reduction in the fuel split value FS. A further passage of time from event E2 occurs and additional data is received. Again, the NOx data is low, maintaining the alarm and resulting in a further event E3. At event E3, the fuel split value FS is again reduced by the same incremental amount. This third incremental adjustment results in the NOx emissions NE rising above the preset limit EL and results in removal of the alarm. The fuel split FS tuning value set after event E3 is held in place by the tuning controller.

Figure 8:
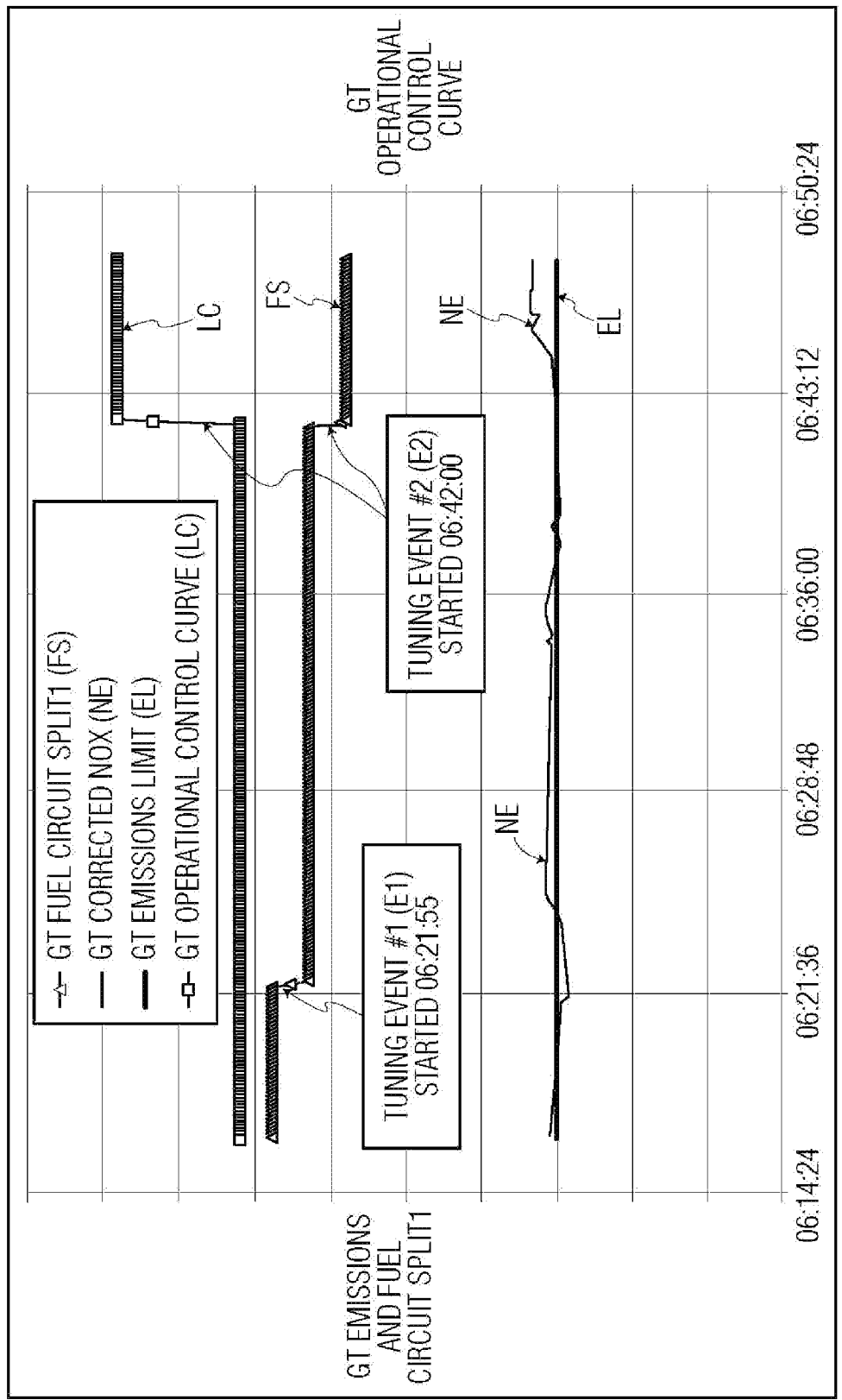

In FIG. 8, the NOx emissions data NE received by the tuning controller is again tracking along the lower emissions limit EL. At the first tuning event E1, the fuel split value FS is incrementally dropped to result in a corresponding increase in the NOx emissions NE over the lower limit EL. After this first incremental adjustment, the NOx emissions for a period of time holds above the limit EL and then begins to again fall. At the second tuning event E2, the fuel split value FS is again adjusted by the designated fixed incremental value. This second adjustment then places the fuel split value FS at its defined minimum within the preset range of values. This value limit moves the tuning operation to the next operational parameter, which is normally the second fuel circuit adjustment. In the example provided, this second circuit value (not shown) is already at its set maximum/minimum. Thus, the tuning operation moves on to the next operational parameter. The tuning operation moves to the load control curves. As shown, at event E2 an incremental adjustment is made in the load control curve value LC. The increase in the LC value results in a corresponding increase in the NOx emission to a value above the minimum EL and removes the alarm. Upon removal of the alarm, the tuning settings are held and no further adjustments are made. The tuning controller then proceeds to receive data from the sensor means, through the DCS, and continues to make comparisons with the set operational standards (including the minimum NOx emissions limit EL).

Figure 9B:
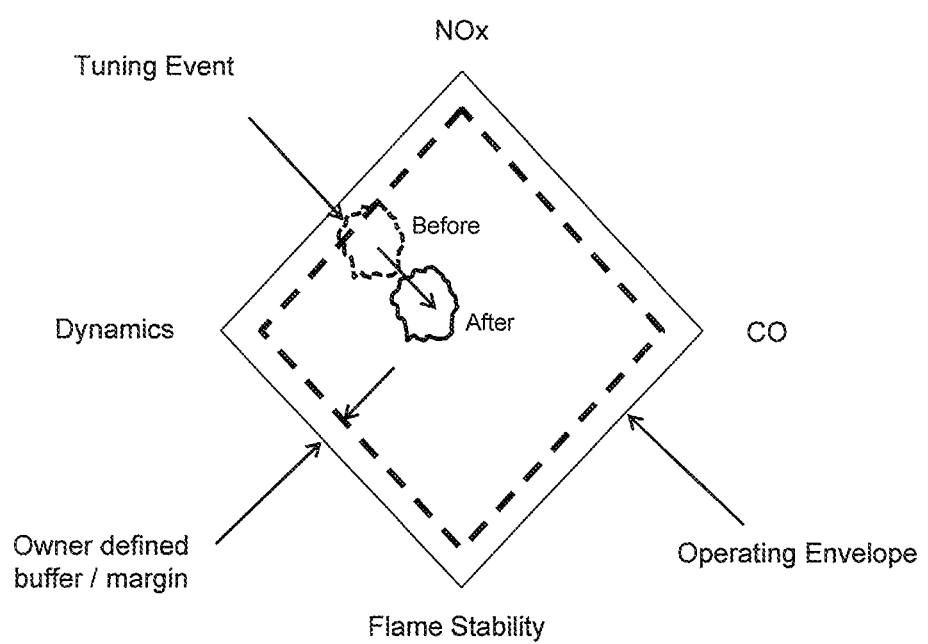

FIGS. 9A and 9B are schematic representations of the operation of the tuning controller within contemplated invention. The operation of the turbine is defined by the emission output of the turbine, both NOx and CO, turbine dynamics and flame stability. In FIG. 9A, a tuned system is defined by a preferred operating envelope in the center of the operational diamond. This preferred operational envelope is typically manually set based on a prior start-up or operation of the turbine system. However, weather changes, both hot and cold, and mechanical changes within the turbine system cause a drift within the operational diamond. Hence a tuning is desired so as to maintain the turbine operation within the preferred range. In FIG. 9B, a defined buffer or margin is set within the operational diamond to serve as a warning for a drift of the turbine operation outside of the preferred operational envelope. Once one of the sensed operational values reaches the defined buffer line or limit, an alarm is generated, causing a tuning event. Based on the direction of the drift, the tuning controller creates a preset reaction to meet the specifics of the tuning need. This preset reaction is a defined incremental shift in an operational parameter of the turbine as a means for moving the turbine operational envelope back into the desired range, and away from the buffer limit.

The present invention has been described and illustrated with respect to a number of exemplary embodiments thereof.

It should understood by those skilled in the art from the foregoing that various other changes, omissions and additions may be made therein, without departing from the spirit and scope of the present invention, with the scope of the present invention being described by the foregoing claims.

What is claimed is:

1. A method for tuning the operation of a combustion turbine comprising:
   monitoring a set of operational parameters including stack emissions and combustion dynamics and comparing the operational parameters to standard operational data;
   using a computer, determining the dominant gas turbine combustion system tuning scenario through the use of Boolean hierarchical logic and multiple levels of control settings; and
   making an adjustment to at least one operational control element of the combustion turbine based on the dominant gas turbine combustion system tuning scenario in response to a departure of the monitored operational parameters from the standard operational data,
   wherein the operational control elements of the combustion turbine comprise inlet fuel temperature, fuel-air ratio and fuel distribution splits.

2. A method for automated control of the gas turbine inlet fuel temperature through automated modification of the fuel gas temperature control set point within a Distributed Control System (DCS), the method comprising:
   monitoring a set of operational parameters including stack emissions and combustion dynamics and comparing the operational parameters to standard operational data;
   communicating the monitored data regarding the operational parameters to a turbine controller through a DCS;
   determining an operational control element for adjustment based on operational priorities of the gas turbine, wherein the operational control elements of the combustion turbine comprise inlet fuel temperature, fuel-air ratio and fuel distribution splits;
   making an adjustment to the gas turbine inlet fuel temperature in response to a departure of the monitored operational parameters from the standard operational data; and
   communicating the desired adjustment to the gas turbine inlet fuel temperature to a fuel heating unit through the DCS.

3. A method for automated control of the gas turbine inlet fuel temperature through automated modification of the fuel gas temperature control set point within the fuel gas temperature controller, the method comprising:
   monitoring a set of operational parameters, including stack emissions and combustion dynamics, and comparing the operational parameters to standard operational data;
   determining an operational control element for adjustment based on operational priorities of the gas turbine, wherein the operational control elements of the combustion turbine comprise inlet fuel temperature, fuel-air ratio and fuel distribution splits;
   making an adjustment to the gas turbine inlet fuel temperature in response to a departure of the monitored operational parameters from the standard operational data; and
   communicating the desired adjustment to the gas turbine inlet fuel temperature directly from the turbine controller to a fuel heating unit.

4. A method for transferring turbine control signals to a gas turbine controller through the use of an existing gas turbine communication network with an external control device, using a Distributed Control System (DCS), the method comprising:
   monitoring a set of operational parameters including stack emissions and combustion dynamics and comparing the operational parameters to standard operational data;
   communicating the monitored data regarding the operational parameters to a turbine controller through a DCS;
   determining an operational control element for adjustment based on operational priorities of the gas turbine, wherein the operational control elements of the combustion turbine comprise inlet fuel temperature, fuel-air ratio and fuel distribution splits;
   making an adjustment to a desired operational control element in response to a departure of the monitored operational parameters from the standard operational data, based on the operational priorities selected within the turbine controller; and
   communicating the desired adjustment to the operational control elements to a desired system for changing levels of the selected operational control element, through the DCS.

5. A method for modification to gas turbine combustion system autotuning settings via a user interface display, which utilizes Boolean-logic toggle switches to select user-desired optimization criteria, and tuning the gas turbine combustion system according to the selected autotuning settings, the method comprising:
   providing an autotuning system for a gas turbine combustion system, including a turbine controller having a user interface display, sensors for monitoring operational parameters and operational control elements for adjusting operating inputs for the gas turbine;
   selecting desired operational priorities for the gas turbine combustion system via the user interface display, whereby selection of a desired operational priority modifies the autotuning settings of the gas turbine combustion system;
   monitoring a set of operational parameters including stack emissions and combustion dynamics and comparing the operational parameters to standard operational data;
   determining an operational control element for adjustment based on the selected operational priorities of the gas turbine; and
   making an adjustment to a desired operational control element in response to a departure of the monitored operational parameters from the standard operational data, based on the operational priorities selected within the turbine controller;
   wherein the operational parameters comprise stack emissions and combustion dynamics, and
   wherein the operational control elements comprise inlet fuel temperature, fuel-air ratio and fuel distribution splits.

6. The method of claim 5, wherein the operational priorities of the gas turbine combustion system are selected from the group comprising optimum dynamics, optimum power and optimum NOx emissions.

* * * * *